(12) United States Patent
Kato et al.

(10) Patent No.: US 7,746,931 B2
(45) Date of Patent: Jun. 29, 2010

(54) MOVING PICTURE ENCODING APPARATUS AND METHOD, MOVING PICTURE DECODING APPARATUS AND METHOD

(75) Inventors: Sadaatsu Kato, Yokosuka (JP); Choong Seng Boon, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1410 days.

(21) Appl. No.: 11/125,209

(22) Filed: May 10, 2005

(65) Prior Publication Data
US 2005/0254010 A1 Nov. 17, 2005

(30) Foreign Application Priority Data
May 13, 2004 (JP) .................. P2004-144074

(51) Int. Cl.
*H04N 7/12* (2006.01)
*H04N 13/00* (2006.01)

(52) U.S. Cl. .................. 375/240.16; 348/42

(58) Field of Classification Search .......... 348/42, 348/43, 47, 384.1, 397.1, 402.1, 407.1, 409.1, 348/413.1, 416.1, 420.1, 46; 382/232, 234, 382/236; 352/59; 375/240.02, 240.03, 240.12, 375/240.1, 240.16, 240.24
See application file for complete search history.

(56) References Cited
U.S. PATENT DOCUMENTS

| | | | | |
|---|---|---|---|---|
| 5,767,898 A | * | 6/1998 | Urano et al. | 348/43 |
| 6,055,012 A | * | 4/2000 | Haskell et al. | 348/48 |
| 6,430,224 B1 | | 8/2002 | Naito et al. | |
| 2003/0202592 A1 | * | 10/2003 | Sohn et al. | 375/240.16 |
| 2004/0008893 A1 | * | 1/2004 | Itoi et al. | 382/236 |
| 2008/0152241 A1 | * | 6/2008 | Itoi et al. | 382/234 |

FOREIGN PATENT DOCUMENTS

| | | |
|---|---|---|
| EP | 1 351 510 A1 | 10/2003 |
| JP | 8-70475 | 3/1996 |
| JP | 2004-48293 | 2/2004 |
| WO | 11-18111 | 1/1999 |

OTHER PUBLICATIONS

"Editor's Proposed Draft Text Modifications for Joint Video Specification (ITU-T Rec.H.264 ISO/IEC 14496-10 AVC), Geneva modifications draft 37", Joint Video Team (JVT) of ISO / IEC MPEG and ITU-VCEG, 2002, pages 1-216.

* cited by examiner

*Primary Examiner*—Behrooz Senfi
(74) *Attorney, Agent, or Firm*—Oblon, Spivak, McClelland, Maier & Neustadt, L.L.P.

(57) ABSTRACT

As an embodiment of a moving picture encoding apparatus, a moving picture type judgment section judges whether an input moving picture is a stereoscopic picture and, when the moving picture is a stereoscopic picture, a stereoscopic picture identifier is set to "1" and a moving picture rotation section rotates the moving picture clockwise by +90 degrees or −90 degrees. On the other hand, when the moving picture is not a stereoscopic picture, the stereoscopic picture identifier is set to "0" and the moving picture is not rotated. Then, a moving picture interlaced encoding section produces an encoded bit stream by performing interlaced encoding of the moving picture and a stereoscopic picture identifier encoding section produces encoded information by encoding the stereoscopic picture identifier. Further, a multiplexing section produces a multiplexed encoded bit stream by multiplexing the above-mentioned encoded bit stream and encoded information.

5 Claims, 25 Drawing Sheets

Fig.2
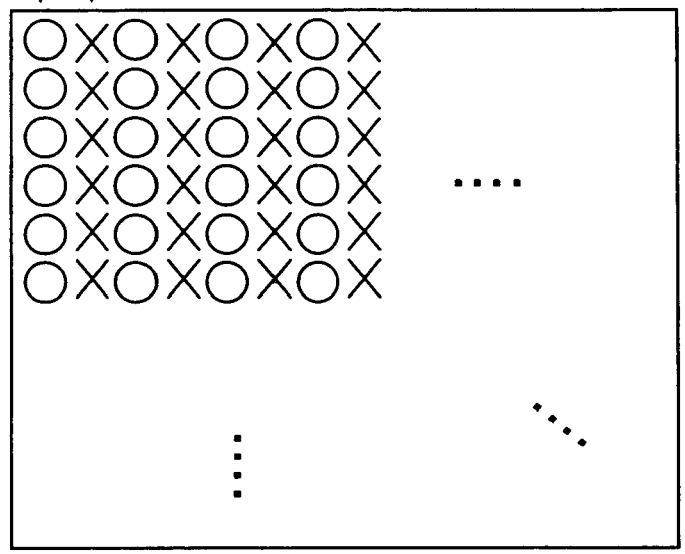
(a)
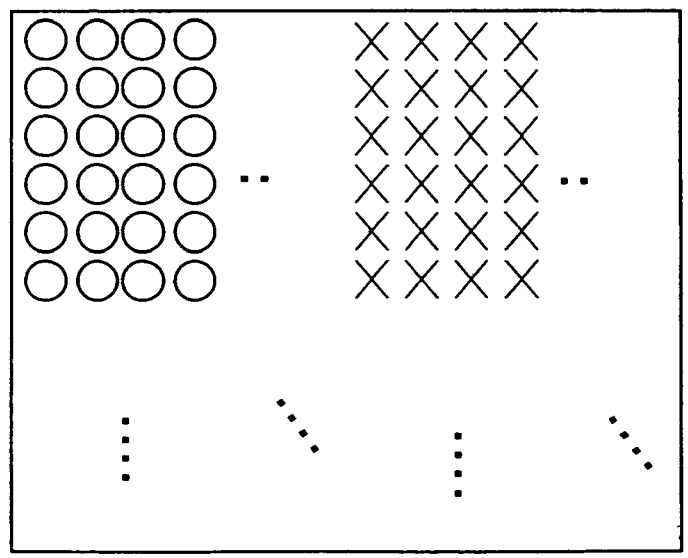
(b)

Fig.4
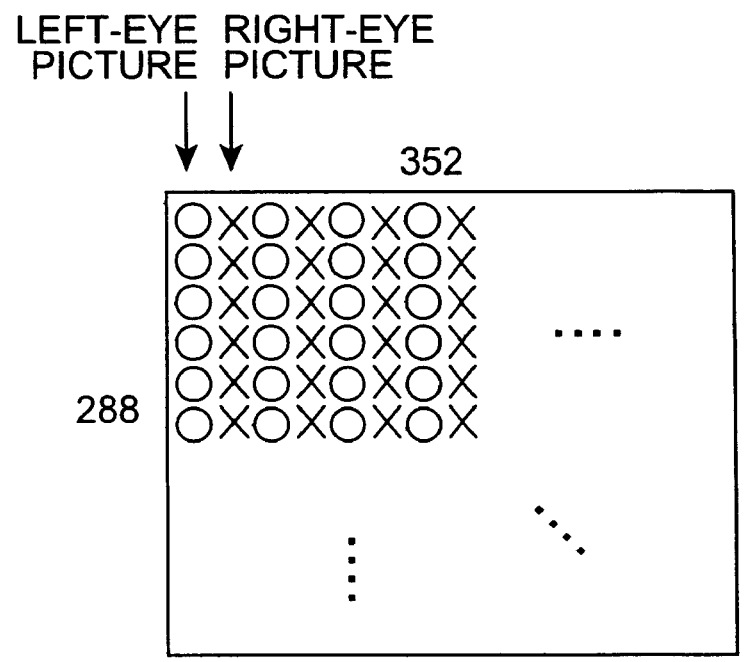
(a)
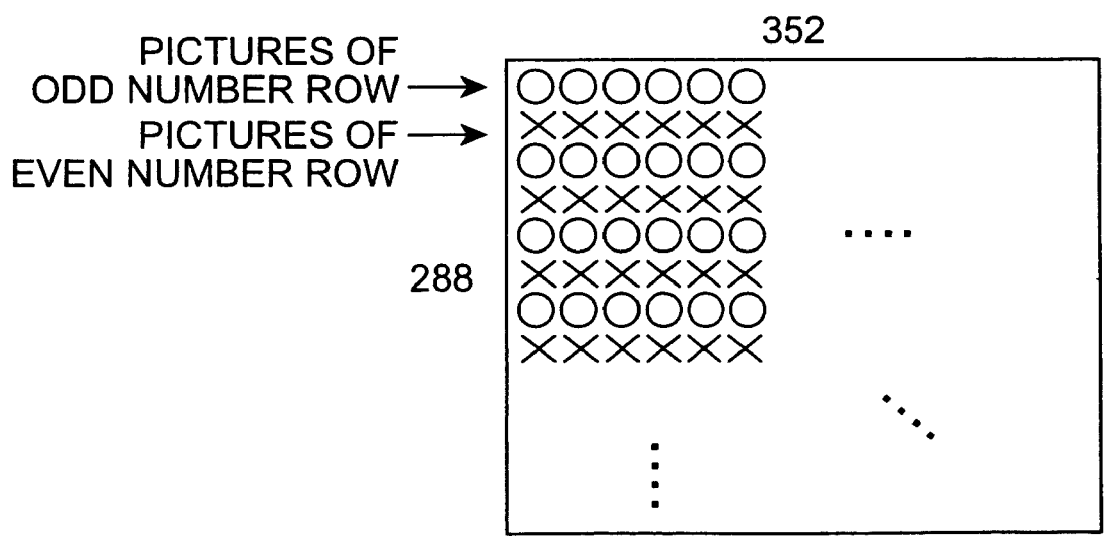
(b)

Fig.15
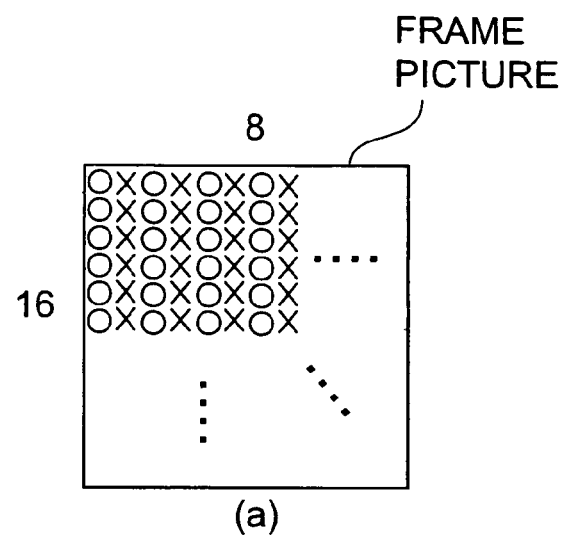
(a) FRAME PICTURE
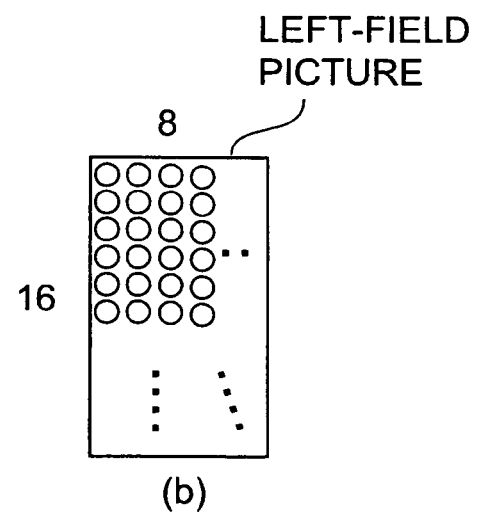
(b) LEFT-FIELD PICTURE
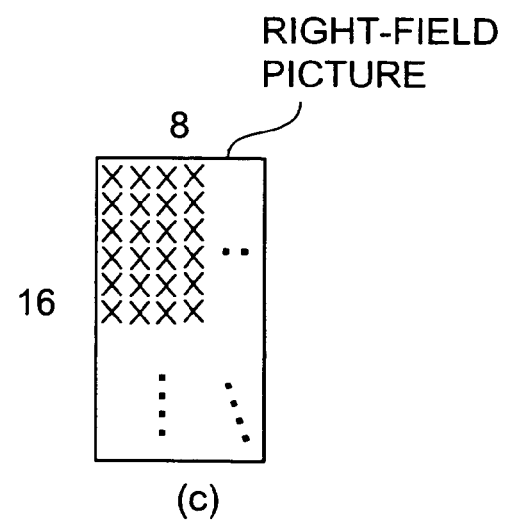
(c) RIGHT-FIELD PICTURE

MOVING PICTURE ENCODING APPARATUS AND METHOD, MOVING PICTURE DECODING APPARATUS AND METHOD

BACKGROUND OF THE INVENTION

1. Field of the Invention

The invention relates to moving picture encoding apparatus and method for encoding a moving picture (so-called stereoscopic moving picture) in which so-called right-eye pictures (also referred to as pictures seen with the right eye) and so-called left-eye pictures (also referred to as pictures seen with the left eye) are arranged alternately in every other column as well as a moving picture (so-called interlaced moving picture) in which pictures of odd number row and pictures of even number row are arranged alternately in every other row. The invention relates to moving picture decoding apparatus and method for decoding the above-mentioned stereoscopic moving picture and interlaced moving picture.

A "left-field picture" means a picture obtained by extracting only the left-eye pictures from a stereoscopic moving picture in which right-eye pictures and left-eye pictures are arranged alternately in every other column, and a "right-field picture" means a picture obtained by extracting only the right-eye pictures from the above-mentioned stereoscopic moving picture.

2. Related Background Art

As one of stereoscopic moving picture display devices, a parallax barrier system stereoscopic video picture display device is known, having a configuration in which a slit plate 12 provided with a lot of slits is arranged in front of a liquid crystal display 11 provided with a filter 10 composed of a plurality of picture arrays as shown in FIG. 1. The stereoscopic video picture display device is configured so that only the left-eye pictures L on the filter are seen with a left-eye 13 of a viewer and only the right-eye pictures R on the filter are seen with a right-eye 14 of the viewer, therefore, the viewer can recognize a stereoscopic picture visually. By the way, a stereoscopic video picture display device having a configuration in which a lenticular plate is to be arranged instead of the slit plate 12 shown in FIG. 1 is also known.

As another stereoscopic moving picture encoding system, for example, "STEREOSCOPIC VIDEO IMAGE TRANSMISSION METHOD AND SYSTEM" disclosed in Japanese Patent Application Laid-open Hei 11-18111 is known. In this art, a conversion picture or conversion image is produced by composing collectively left-eye pictures on the left half side and right-eye pictures on the right half side for rearrangement, as shown in FIG. 2 (b), from a stereoscopic picture in which left-eye pictures and right-eye pictures are arranged alternately in every other vertical column. Next, processing such as moving picture encoding, encoded data transmission, encoded data reception, and moving picture decoding of the produced conversion picture is performed. After this, the same picture as the stereoscopic picture, which is an input signal, is reproduced by making such pixel disposition of the decoded conversion picture that left-eye pictures and right-eye pictures are again arranged alternately in every other column by rearrangement thereof.

SUMMARY OF THE INVENTION

In a stereoscopic picture of a nearby object, there is caused a large amount of parallax between the left-eye picture and the right-eye picture while in a stereoscopic picture of a distant object, there is caused a small amount of parallax between the left-eye picture and the right-eye picture. Therefore, particularly in a block showing a distant object, data compression efficiency can be improved by utilizing the correlativity between the left-eye picture and the right-eye picture.

In the above-mentioned prior art, however, since left-eye pictures are arranged on the left half side and right-eye pictures are arranged on the right half side in a conversion picture, there arises a problem, when moving picture encoding being performed, that no correlativity between the left-eye pictures and the right-eye pictures can be utilized and therefore no data compression efficiency can be improved.

Moreover, since encoding is performed after the left-eye pictures are arranged on the left half side and the right-eye pictures are arranged on the right half side in the conversion picture, when the picture being displayed in the above-mentioned parallax barrier system stereoscopic moving picture display device, it is necessary to carry out rearrangement such that the left-eye pictures and the right-eye pictures are arranged alternately in every other column by changing the pixel arrangement of the picture after decoding processing. Because of this, there arises another problem that it is difficult to improve the efficiency of processing.

The present invention has been made in order to solve the above-mentioned problems and an object of the present invention is to provide moving picture encoding apparatus and method, picture moving picture decoding apparatus and method capable of efficiently performing picture processing of a stereoscopic moving picture.

In order to attain the above-mentioned object, according to the present invention there is provided a moving picture encoding apparatus for encoding a stereoscopic moving picture in which right-eye pictures and left-eye pictures are arranged alternately in every other column and an interlaced moving picture in which pictures of odd number row and pictures of even number row are arranged alternately in every other row, the apparatus as its characterizing features, comprising: a moving picture type judgment section for judging whether the moving picture to be encoded is a stereoscopic moving picture; a moving picture rotation section for rotating the moving picture in a predetermined direction by predetermined angles so that the vertical direction changes to the horizontal direction when the moving picture to be encoded is judged to be a stereoscopic moving picture; a moving picture interlaced encoding section for performing interlaced encoding of a moving picture judged not to be a stereoscopic moving picture and the moving picture judged to be a stereoscopic moving picture and rotated by the predetermined angles; a stereoscopic picture identifier encoding section for encoding a stereoscopic picture identifier indicating whether the moving picture to be encoded is a stereoscopic moving picture; and a multiplexing section for producing a multiplexed encoded bit stream by multiplexing an encoded bit stream obtained by the interlaced encoding performed by the moving picture interlaced encoding section and the code of a stereoscopic picture identifier obtained by the encoding performed by the stereoscopic picture identifier encoding section.

The above-mentioned moving picture type judgment section may judge whether the moving picture to be encoded is a stereoscopic moving picture based on the input picture signal or may judge whether the moving picture to be encoded is a stereoscopic moving picture according to predetermined rules.

Further, when the moving picture to be encoded is judged to be a stereoscopic moving picture, the moving picture rotation section may rotate the moving picture, for example, clockwise by +90 degrees or may rotate the moving picture clockwise by −90 degrees such that the vertical direction of the moving picture changes to the horizontal direction.

At this time, it is preferable for the stereoscopic picture identifier encoding section to include information about the rotation performed to the moving picture to be encoded by the moving picture rotation section in the stereoscopic picture identifier when performing encoding.

In order to attain the above-mentioned object, according to the present invention there is provided a moving picture decoding apparatus for decoding a stereoscopic moving picture in which right-eye pictures and left-eye pictures are arranged alternately in every other column as well as an interlaced moving picture in which pictures of odd number row and pictures of even number row are arranged alternately in every other row, the decoding apparatus, as its characterizing features, comprising: a separation section for separating a received multiplexed encoded bit stream into an encoded bit stream of a moving picture and a stereoscopic picture identifier code; a moving picture interlaced decoding section for performing interlaced decoding of the separated encoded bit stream of the moving picture; a stereoscopic picture identifier decoding section for decoding the separated stereoscopic picture identifier code; and a processing control section for performing picture processing for the moving picture signal obtained by the interlaced decoding performed by the moving picture interlaced decoding section, the picture processing being in accordance with the stereoscopic picture identifier obtained by the decoding performed by the stereoscopic picture identifier decoding section.

At this time, it is preferable for the processing control section to perform picture processing to the moving picture signal so that the moving picture is reproduced based on the information about the rotation included in the stereoscopic picture identifier obtained by decoding.

According to the above-mentioned moving picture encoding apparatus and moving picture decoding apparatus, the data compression efficiency can be improved by rotating the moving picture, when the moving picture to be encoded being judged to be a stereoscopic moving picture, in the predetermined direction by the predetermined degrees such that the vertical direction of the moving picture changes to the horizontal direction, performing interlaced encoding of the moving picture judged not to be a stereoscopic picture as well as the moving picture judged to be a stereoscopic moving picture and rotated by the predetermined degrees, and utilizing the correlation between the left-eye picture and the right-eye picture.

Since an output picture having the same pixel arrangement as that of the input stereoscopic moving picture signal is obtained, when the picture being displayed in a parallax barrier system stereoscopic moving picture display device, the same picture signal as that of the input picture can be obtained without changing the order of the picture signals in the line after decoding processing.

Since it is possible to encode and decode a stereoscopic moving picture signal, in which picture left-eye pictures and right-eye pictures are arranged alternately in every other column and an interlaced moving picture signal, in which picture pictures of odd number row and pictures of even number row are arranged alternately in every other row using the same moving picture encoding apparatus and the same moving picture decoding apparatus, respectively, the effective use of the apparatus is possible.

In order to attain the above-mentioned object, the moving picture encoding apparatus according to the present invention is a moving picture encoding apparatus for encoding a stereoscopic moving picture in which right-eye pictures and left-eye pictures are arranged alternately in every other column and an interlaced moving picture in which pictures of odd number row and pictures of even number row are arranged alternately in every other row, the encoding apparatus, as its characterizing features, comprising: a moving picture type judgment section for judging whether the moving picture to be encoded is a stereoscopic moving picture based on the input picture signal representing the moving picture to be encoded; a motion detection section for selecting a prediction mode in accordance with the type of the moving picture obtained by the judgment, and for, when a interframe prediction mode is selected as the prediction mode, detecting a motion vector for the moving picture to be encoded; a motion compensation section for performing motion compensation for the moving picture based on the type of the moving picture, the selected prediction mode, and the detected motion vector, a spatial prediction section for performing a spatial prediction for the moving picture based on the type of the moving picture and the selected prediction mode; an orthogonal transformation section for performing an orthogonal transformation for a predictive residue signal obtained as a difference between the predicted picture signal obtained by the motion compensation or the spatial prediction and the input picture signal based on the type of the moving picture and the selected prediction mode; a variable length encoding section for performing predetermined picture processing including variable length encoding for the picture data after the orthogonal transformation based on the type of the moving picture and the selected prediction mode; and an inverse orthogonal transformation section for performing predetermined picture processing including inverse orthogonal transformation for the picture data after the orthogonal transformation based on the type of the moving picture and the selected prediction mode.

At this time, it is preferable for the motion detection section to, when the moving picture to be encoded is a stereoscopic moving picture and a prediction for the region to be encoded as a field picture is made based on the selected prediction mode, detect the motion vector for each of separated left and right fields as the left-field picture and the right-field picture of the region to be encoded.

Further, at this time, it is preferable for the motion compensation section to, when the moving picture to be encoded is a stereoscopic moving picture and a prediction for the region to be encoded as a field picture is made based on the selected prediction mode, perform motion compensation for each of separated left and right fields as the left-field picture and the right-field picture of the region to be encoded.

Further, at this time, it is preferable for the spatial prediction section to, when the moving picture to be encoded is a stereoscopic moving picture and a prediction for the region to be encoded as a field picture is made based on the selected prediction mode, perform a spatial prediction for each of separated left and right fields as the left-field picture and the right-field picture of the region to be encoded.

Further, at this time, it is preferable for the orthogonal transformation section to, when the moving picture to be encoded is a stereoscopic moving picture and a prediction for the region to be encoded as a field picture is made based on the selected prediction mode, perform an orthogonal transformation for each of separated left and right fields as the left-field predictive residue picture and the right-field predictive residue picture of the predictive residue picture based on the predictive residue signal.

Further, at this time, it is preferable for the inverse orthogonal transformation section to, when the moving picture to be encoded is a stereoscopic moving picture and a prediction for the region to be encoded as a field picture is made based on the selected prediction mode, perform predetermined picture processing including inverse orthogonal transformation for each of separated left and right fields as the left-field picture data and the right-field picture data of the picture data after the orthogonal transformation.

In order to attain the above-mentioned object, the moving picture decoding apparatus according to the present invention is a moving picture decoding apparatus for decoding a stereoscopic moving picture in which right-eye pictures and left-eye pictures are arranged alternately in every other column and an interlaced moving picture in which pictures of odd number row and pictures of even number row are arranged alternately in every other row, and is characterized by comprising: a variable length decoding section for decoding type information as to whether the moving picture to be decoded is a stereoscopic picture, prediction mode information about the region to be decoded, and picture data having been subjected to orthogonal transformation in the region to be decoded; a motion vector reproduction section for reproducing the motion vector in the region to be decoded based on the type information and the prediction mode information obtained by the decoding, a motion compensation section for performing motion compensation with respect to the region to be decoded based on the type information, the prediction mode information, and the reproduced motion vector, a spatial prediction section for performing a spatial prediction on the region to be decoded based on the type information and the prediction mode information; an inverse orthogonal transformation section for performing predetermined picture processing including inverse orthogonal transformation for the picture data having been subjected to orthogonal transformation in the region to be decoded obtained by the decoding, based on the type information and the prediction mode information; and a picture data generation section for generating picture data in the region to be decoded, based on the predictive residue signal obtained by the picture processing by the inverse orthogonal transformation section and the predicted picture signal obtained by the motion compensation or the spatial prediction.

At this time, it is preferable for the motion vector reproduction section to, when the moving picture to be decoded is a stereoscopic moving picture and a prediction for the region to be decoded as a field picture is made based on the prediction mode information, reproduce the motion vector for each of separated left and right fields as the left-field picture and the right-field picture of the region to be decoded.

Further, at this time, it is preferable for the motion compensation section to, when the moving picture to be decoded is a stereoscopic moving picture and a prediction for the region to be decoded as a field picture is made based on the prediction mode information, perform motion compensation for each of separated left and right fields as the left-field picture and the right-field picture of the region to be decoded.

Further, at this time, it is preferable for the spatial prediction section to, when the moving picture to be decoded is a stereoscopic moving picture and a prediction for the region to be decoded as a field picture is made based on the prediction mode information, make a spatial prediction for each of separated left and right fields as the left-field picture and the right-field picture of the region to be decoded.

Further, at this time, it is preferable for the inverse orthogonal transformation section to, when the moving picture to be decoded is a stereoscopic moving picture and a prediction for the region to be decoded as a field picture is made based on the prediction mode information, perform an inverse orthogonal transformation for each of separated left and right fields as the left-field picture and the right-field picture of the region to be decoded.

According to the above-mentioned moving picture encoding apparatus and moving picture decoding apparatus, the data compression efficiency can be improved by performing encoding and decoding based on at least the type of the moving picture and the selected prediction mode and utilizing the correlation between the left-eye picture and the right-eye picture.

Since an output picture having the same pixel arrangement as that of the input stereoscopic moving picture signal is obtained, when the picture is displayed in a parallax barrier system stereoscopic moving picture display device, the same picture signal as that of the input picture can be obtained without changing the order of the picture signals in the line after decoding processing.

Since it is possible to encode and decode a stereoscopic moving picture signal, in which picture left-eye pictures and right-eye pictures are arranged alternately in every other column and an interlaced moving picture signal, in which picture pictures of odd number row and pictures of even number row are arranged alternately in every other column using the same moving picture encoding apparatus and the same moving picture decoding apparatus, respectively, the effective use of the apparatus is possible.

The invention relating to the above-mentioned moving picture encoding apparatus and moving picture decoding apparatus can be regarded as the invention relating to the following moving picture encoding method and moving picture decoding method and the same effects can be obtained.

In other words, the moving picture encoding method according to the present invention is a moving picture encoding method for encoding a stereoscopic moving picture in which right-eye pictures and left-eye pictures are arranged alternately in every other column and an interlaced moving picture in which pictures of odd number row and pictures of even number row are arranged alternately in every other row, and is characterized by comprising: a moving picture type judgment step for judging whether the moving picture to be encoded is a stereoscopic moving picture; a moving picture rotation step for rotating the moving picture in a predetermined direction by predetermined angles so that the vertical direction changes to the horizontal direction when the moving picture to be encoded is judged to be a stereoscopic moving picture; a moving picture interlaced encoding step for performing interlaced encoding of a moving picture judged not to be a stereoscopic moving picture and the moving picture judged to be a stereoscopic moving picture and rotated by the predetermined angles; a stereoscopic picture identifier encoding step for encoding a stereoscopic picture identifier indicating whether the moving picture to be encoded is a stereoscopic moving picture; and a multiplexing step for producing a multiplexed encoded bit stream by multiplexing an encoded bit stream obtained by the interlaced encoding and the code of a stereoscopic picture identifier obtained by the encoding.

The moving picture decoding method according to the present invention is a moving picture decoding method for decoding a stereoscopic moving picture in which right-eye pictures and left-eye pictures are arranged alternately in every other column and an interlaced moving picture in which pictures of odd number row and pictures of even number row are arranged alternately in every other row, and is characterized by comprising: a separation step for separating a received multiplexed encoded bit stream into an encoded bit stream of a moving picture and a stereoscopic picture identifier code; a moving picture interlaced decoding step for performing interlaced decoding of the separated encoded bit stream of the moving picture; a stereoscopic picture identifier decoding step for decoding the separated stereoscopic picture identifier code; and a processing control step for performing picture processing for the moving picture signal obtained by the interlaced decoding, the picture processing being in accordance with the stereoscopic picture identifier obtained by the decoding.

The moving picture encoding method according to the present invention is a moving picture encoding method for encoding a stereoscopic moving picture in which right-eye pictures and left-eye pictures are arranged alternately in every other column and an interlaced moving picture in which pictures of odd number row and pictures of even number row are arranged alternately in every other row, and is characterized by comprising: a moving picture type judgment step for judging whether the moving picture to be encoded is a stereoscopic moving picture based on the input picture signal representing the moving picture to be encoded; a motion detection step for selecting a prediction mode in accordance with the type of the moving picture obtained by the judgment, and for, when a interframe prediction mode is selected as the prediction mode, detecting a motion vector for the moving picture to be encoded; a motion compensation step for performing motion compensation for the moving picture based on the type of the moving picture, the selected prediction mode, and the detected motion vector; a spatial prediction step for performing a spatial prediction for the moving picture based on the type of the moving picture and the selected prediction mode; an orthogonal transformation step for performing an orthogonal transformation for a predictive residue signal obtained as a difference between the predicted picture signal obtained by the motion compensation or the spatial prediction and the input picture signal based on the type of the moving picture and the selected prediction mode; a variable length encoding step for performing predetermined picture processing including variable length encoding for the picture data after the orthogonal transformation based on the type of the moving picture and the selected prediction mode; and an inverse orthogonal transformation step for performing predetermined picture processing including inverse orthogonal transformation for the picture data after the orthogonal transformation based on the type of the moving picture and the selected prediction mode.

The moving picture decoding method according to the present invention is a moving picture decoding method for decoding a stereoscopic moving picture in which right-eye pictures and left-eye pictures are arranged alternately in every other column and an interlaced moving picture in which pictures of odd number row and pictures of even number row are arranged alternately in every other row, and is characterized by comprising: a variable length decoding step for decoding type information as to whether the moving picture to be decoded is a stereoscopic picture, prediction mode information about the region to be decoded, and picture data having been subjected to orthogonal transformation in the region to be decoded; a motion vector reproduction step for reproducing the motion vector in the region to be decoded based on the type information and the prediction mode information obtained by the decoding; a motion compensation step for performing motion compensation with respect to the region to be decoded based on the type information, the prediction mode information, and the reproduced motion vector; a spatial prediction step for performing a spatial prediction on the region to be decoded based on the type information and the prediction mode information; an inverse orthogonal transformation step for performing predetermined picture processing including inverse orthogonal transformation for the picture data having been subjected to orthogonal transformation in the region to be decoded obtained by the decoding, based on the type information and the prediction mode information, and a picture data generation step for generating picture data in the region to be decoded, based on the predictive residue signal obtained by the picture processing and the predicted picture signal obtained by the motion compensation or the spatial prediction.

According to the present invention, the data compression efficiency can be improved by utilizing the correlation between the left-eye picture and the right-eye picture.

Since an output picture having the same pixel arrangement as that of the input stereoscopic moving picture signal is obtained, when the picture is displayed in a parallax barrier system stereoscopic moving picture display device, the same picture signal as that of the input picture can be obtained without changing the order of the picture signals in the line after decoding processing.

Since it is possible to encode and decode a stereoscopic moving picture signal, in which picture left-eye pictures and right-eye pictures are arranged alternately in every other column and an interlaced moving picture signal, in which picture pictures of odd number row and pictures of even number row are arranged alternately in every other row using the same moving picture encoding apparatus and the same moving picture decoding apparatus, respectively, the effective use of the apparatus is possible.

BRIEF DESCRIPTION OF THE DRAWINGS

FIG. 2 is a diagram showing a conventional stereoscopic moving picture encoding system.

FIG. 4 is a diagram showing the pixel arrangement of a stereoscopic picture and the pixel arrangement of an interlaced picture.

FIG. 15 is a diagram showing a frame picture of a stereoscopic picture, a left-field picture of the stereoscopic picture, and a right-field picture of the stereoscopic picture.

DESCRIPTION OF THE PREFERRED EMBODIMENTS

Moving picture encoding apparatus and method and moving picture decoding apparatus and method according to embodiments of the present invention are explained below with reference to the drawings. In each drawing, the same elements are provided with the same symbols and duplicated explanations will be not given here.

First Embodiment (Configuration of Moving Picture Encoding Apparatus)

Figure 1:
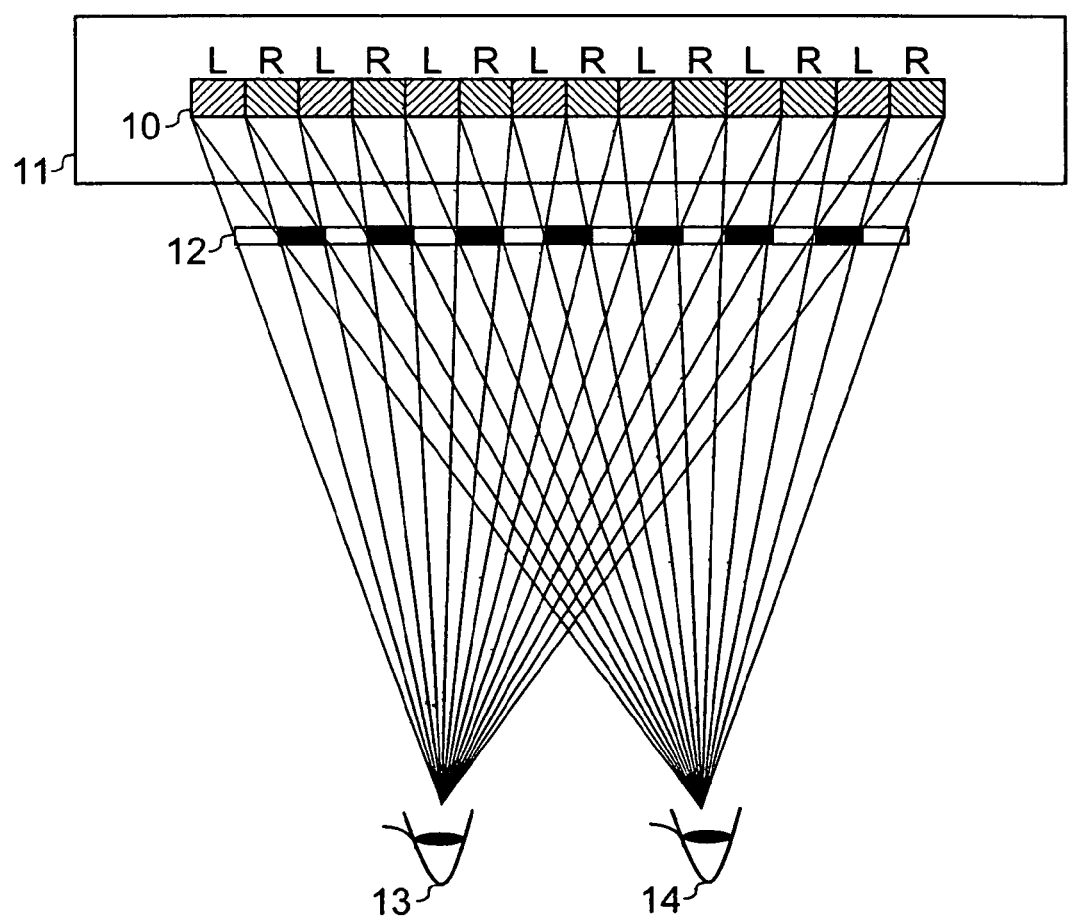
FIG. 1 is a diagram for explaining the principles of a stereoscopic video picture display employing the parallax barrier system.
Figure 3:
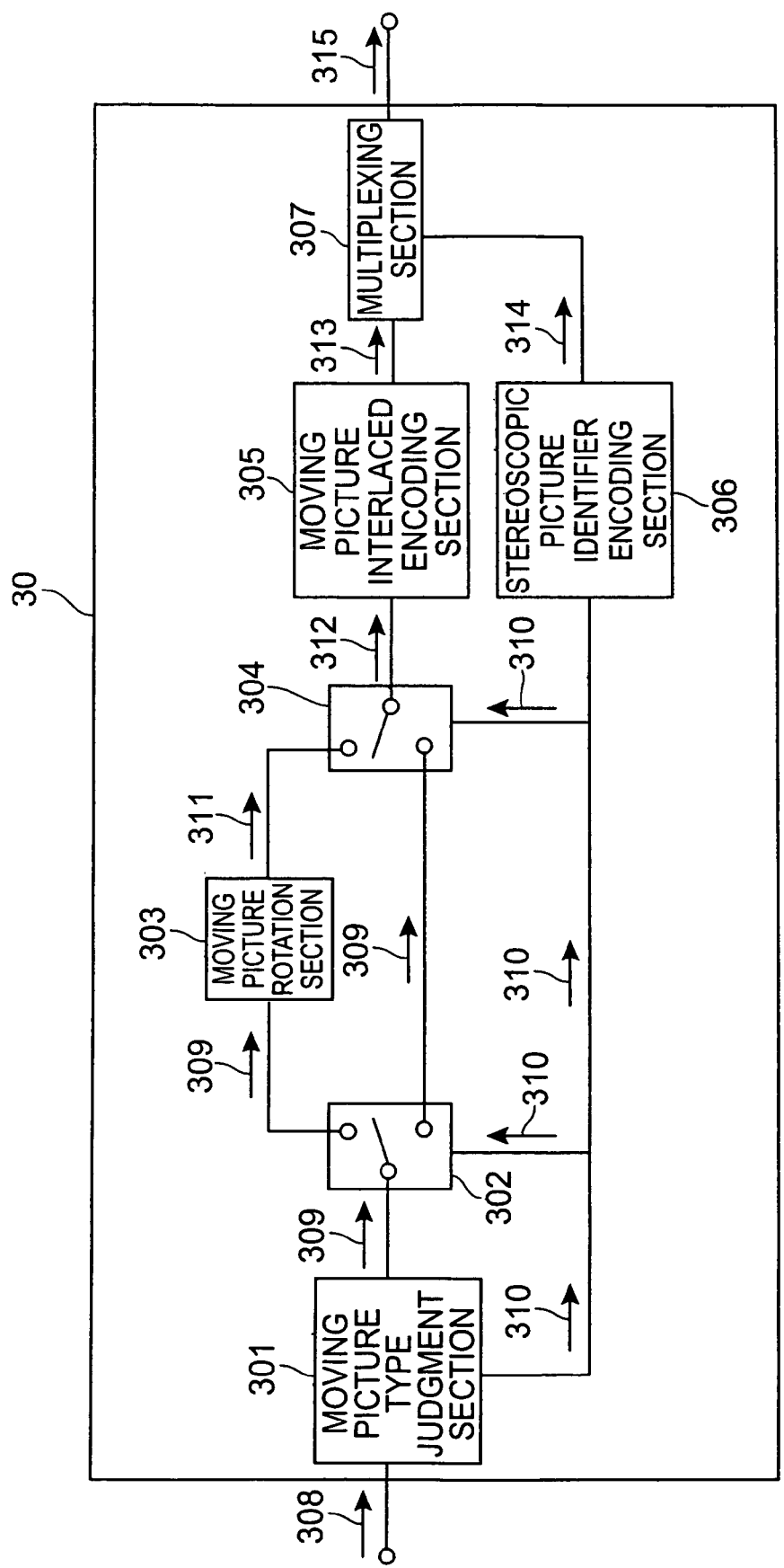
FIG. 3 is a diagram showing a moving picture encoding apparatus in a first embodiment.

First, with reference to FIG. 3, the moving picture encoding apparatus according to the present embodiment will be explained below. A moving picture encoding apparatus 30 according to the present embodiment comprises, as its functional components, a moving picture type judgment section 301, a switch 302, a moving picture rotation section 303, a switch 304, a moving picture interlaced encoding section 305, a stereoscopic picture identifier encoding section 306, and a multiplexing section 307.

The moving picture type judgment section 301 receives an input moving picture signal 308 and judges the type of the received moving picture. When the received moving picture is a stereoscopic picture signal, in which picture left-eye-pictures and right-eye pictures are arranged alternately in every other vertical column as shown in FIG. 4 (a), the moving picture type judgment section 301 sends information (for example, a stereoscopic picture identifier set to "1") 310 that the input picture is a stereoscopic picture to the switch 302, the switch 304, and the stereoscopic picture identifier encoding section 306. On the other hand, when the received moving picture is an interlaced picture signal, where pictures of odd number row and pictures of even number row are arranged horizontally alternately in every other row as shown in FIG. 4 (b), the moving picture type judgment section 301 sends the information (for example, a stereoscopic picture identifier set to "0") 310 that the input picture is not a stereoscopic picture to the switch 302, the switch 304, and the stereoscopic picture identifier encoding section 306. Further, the moving picture type judgment section 301 sends a received moving picture signal 309 to the switch 302. By the way, FIG. 4 described above shows an example of an input picture having 352 pixels in the horizontal direction and 288 pixels in the vertical direction.

The judgment of the type of a picture in the moving picture type judgment section 301 may be made for example, based on information detected or obtained by detecting the picture type added to the input picture. Further, the judgment of the type of a picture in the moving picture type judgment section 301 may be made based on the information about the picture type such as a set file given from the outside before encoding.

Still further, the judgment of the type of a picture in the moving picture type judgment section 301 may be made based on the result of the analysis of relationships pertaining to luminance values of an input picture as stated below. For example, a left-field picture and a right-field picture are produced by separating the input picture alternately in every other column, wherein in the event of the correlation of luminance values in the horizontal direction of each of the separated field pictures being higher than the correlation of luminance values in the horizontal direction of the frame picture before the separation, the input picture may be judged to be a stereoscopic picture. On the other hand, for example, an upper-field picture and a lower-field picture are produced by separating the input picture horizontally alternately and, when the correlation of luminance values in the vertical direction of each of the separated field pictures being higher than the correlation of luminance values in the vertical direction of the frame picture before the separation, the input picture may be judged to be an interlaced picture.

The judgment method of the type of a picture is not limited to the method described above as an example.

The switch 302 receives the moving picture signal 309 and the stereoscopic picture identifier 310 sent from the moving picture type judgment section 301 and when the stereoscopic picture identifier is "1", the switch 302 sends the moving picture signal 309 to the moving picture rotation section 303 and when the stereoscopic picture identifier is "0", sends the moving picture signal 309 to the switch 304.

The moving picture rotation section 303 receives the moving picture signal 309 sent from the switch 302, converts the moving picture represented by the moving picture signal 309 into a moving picture signal 311 representing a moving picture in which right-eye pictures and left-eye pictures are arranged horizontally alternately as in an interlaced moving picture by rotating the moving picture clockwise by +90 degrees, and sends the moving picture signal 311 to the switch 304.

Figure 5:
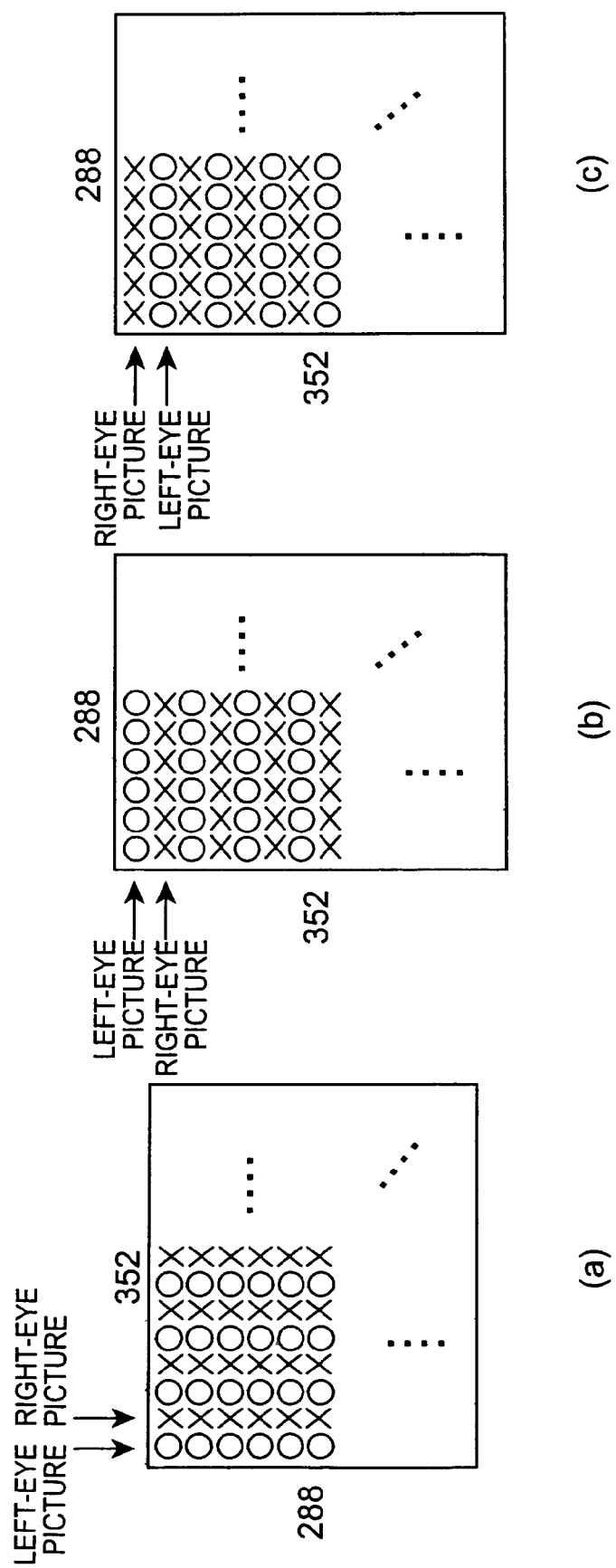
FIG. 5 is a diagram showing the pixel arrangement of a stereoscopic picture, the pixel arrangement of the stereoscopic picture rotated clockwise by +90 degrees, and the pixel arrangement of the stereoscopic picture rotated clockwise by −90 degrees.

FIG. 5 shows an example in which a stereoscopic moving picture is rotated clockwise by +90 degrees by the moving picture rotation section 303, and FIG. 5 (a) shows a moving picture represented by the moving picture signal 309 sent from the switch 302 and FIG. 5 (b) shows a moving picture when the moving picture in FIG. 5 (a) is rotated clockwise by +90 degrees. By the way, FIG. 5 described above shows an example of an input picture having 352 pixels in the horizontal direction and 288 pixels in the vertical direction.

The switch 304 selects either the moving picture signal 311 sent from the moving picture rotation section 303 or the moving picture signal 309 sent from the switch 302 based on the stereoscopic picture identifier 310 sent from the moving picture type judgment section 301. In other words, the switch 304 selects the moving picture signal 311 sent from the moving picture rotation section 303 when the stereoscopic picture identifier 310 is "1", or selects the moving picture signal 309 sent from the switch 302 when the stereoscopic picture identifier 310 is "0", and sends the selected moving picture signal as a moving picture signal 312 to the moving picture interlaced encoding section 305.

The moving picture interlaced encoding section 305 receives the moving picture signal 312 sent from the switch 304 and produces an encoded bit stream 313 by performing interlaced encoding of the moving picture. Then, the moving picture interlaced encoding section 305 sends the produced encoded bit stream 313 to the multiplexing section 307. One of examples of the interlaced encoding system used in the moving picture interlaced encoding section 305 is the H.264/AVC encoding system (refer to Joint Video Team (JVT) of ISO/IEC MPEG and ITU-VCEG, "Editor's Proposed Draft Text Modifications for Joint Video Specification (ITU-T Rec. H.264|ISO/IEC 14496-10 AVC), Geneva modifications draft 37"). However, any system of encoding method in accordance with the encoding of an interlaced picture can be applied, not limited to the above-mentioned H.264/AVC encoding system.

The stereoscopic picture identifier encoding section 306 encodes the stereoscopic picture identifier 310 sent from the moving picture type judgment section 301 and sends a code obtained by the encoding to the multiplexing section 307.

The multiplexing section 307 multiplexes the encoded bit stream 313 sent from the moving picture interlaced encoding section 305 and the code 314 of the stereoscopic picture identifier sent from stereoscopic picture identifier encoding section 306 and transmits the bit stream obtained by the multiplexing to the outside as a multiplexed encoded bit stream 315.

FIGS. 6-9 show examples of the multiplexed encoded bit stream 315 to be transmitted to the outside.

The multiplexed encoded bit stream 315 is composed of encoded information (sequence header) about the whole of a moving picture, encoded information (frame header) about each frame of the moving picture, encoded information (slice header) about each slice consisting of several combined blocks, which are encoding units of the moving picture, encoded information (macro block header) about each macro block of the moving picture, and encoded information for each macro block, all of the encoded information being multiplexed after a synchronization signal indicating the beginning of each sequence.

Figure 6:
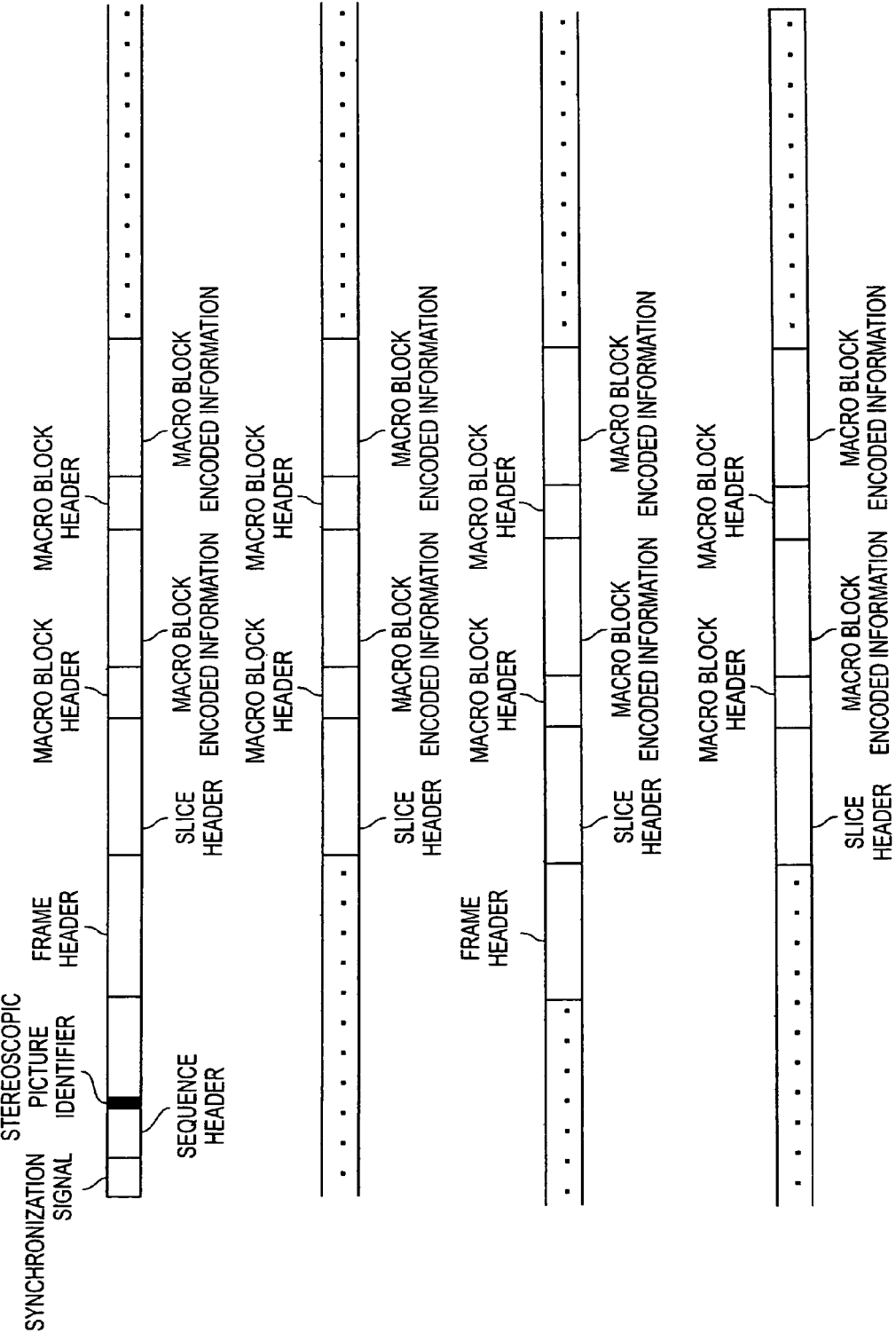
FIG. 6 is a diagram showing an example of a multiplexed encoded bit stream to be transmitted to the outside.
Figure 7:
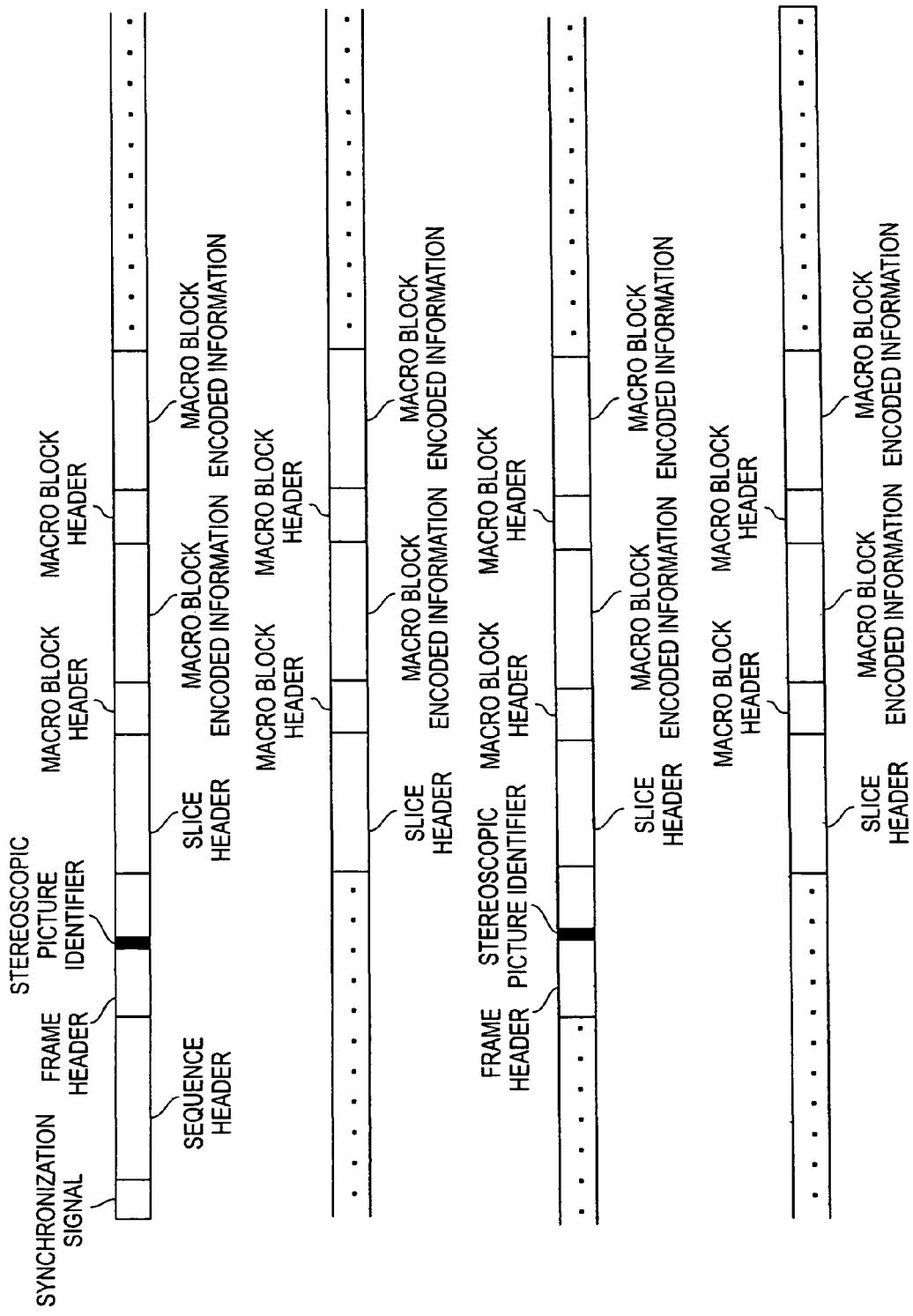
FIG. 7 is a diagram showing an example of a multiplexed encoded bit stream to be transmitted to the outside.
Figure 8:
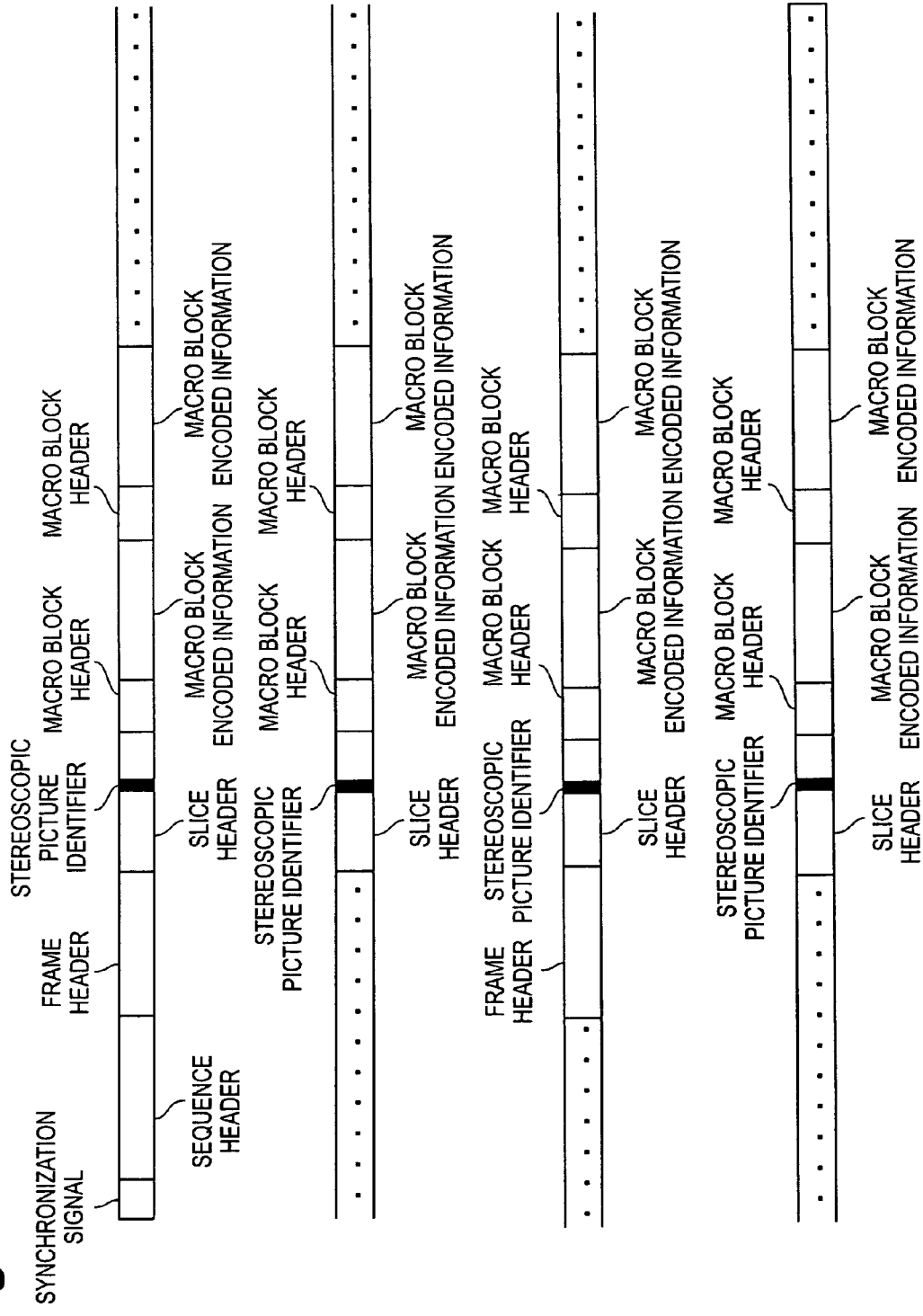
FIG. 8 is a diagram showing an example of a multiplexed encoded bit stream to be transmitted to the outside.
Figure 9:
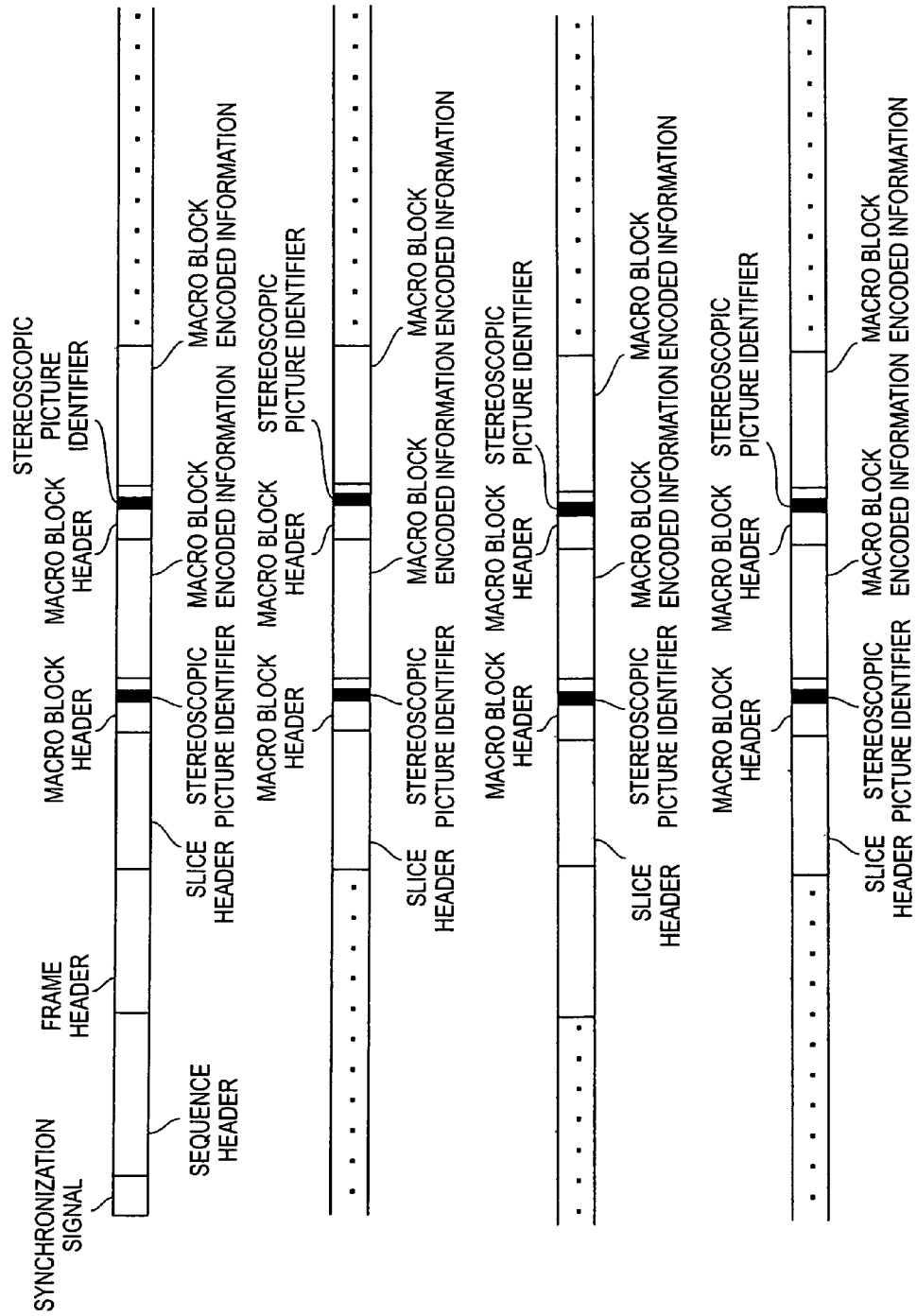
FIG. 9 is a diagram showing an example of a multiplexed encoded bit stream to be transmitted to the outside.

The code of the stereoscopic picture identifier, which is the information about the type of an input moving picture, may be transmitted in a state of being included in the sequence header as shown in FIG. 6 or in a state of being included in the frame header as shown in FIG. 7. Moreover, the code of the stereoscopic picture identifier described above may be transmitted in a state of being in the slice header as shown in FIG. 8 or in a state of being included in the macro header as shown in FIG. 9.

The moving picture rotation section 303 may receive the moving picture signal 309 sent from the switch 302, convert the moving picture shown in FIG. 5 (a) represented by the moving picture signal 309 into the moving picture signal 311 representing the moving picture (refer to FIG. 5 (c)) in which left-eye pictures and right-eye pictures are arranged horizontally alternately in every other row, as in an interlaced moving picture by rotating the moving picture clockwise by −90 degrees (that is, +90 degrees in the counterclockwise direction), and send the moving picture signal 311 to the switch 304.

The moving picture rotation section 303 rotates the moving picture signal 309 sent from the switch 302 clockwise by +90 degrees or −90 degrees in accordance with a predetermined rotation method.

The information as to whether the moving picture rotation section 303 rotates the moving picture signal 309 clockwise by +90 degrees or −90 degrees may be transmitted as information about the encoding of a moving picture in the multiplexed encoded bit stream 315 together with the stereoscopic picture identifier. For example, as information about the encoding of a moving picture, code "10" when the stereoscopic picture identifier is "1" and the moving picture rotation section 303 converts the moving picture signal 309 sent from the switch 302 into the moving picture signal 311 by rotating the signal clockwise by +90 degrees, code "11" when the stereoscopic picture identifier is "1" and the moving picture rotation section 303 converts the moving picture signal 309 sent from the switch 302 into the moving picture signal 311 by rotating the signal clockwise by −90 degrees, and code "0" when the stereoscopic picture identifier is "0" may be multiplexed in the multiplexing section 307 together with the stereoscopic picture identifier and transmitted as the multiplexed encoded bit stream 315.

(Operation of Moving Picture Encoding Apparatus)

Next, the operation of the moving picture encoding apparatus 30 of the present invention is explained below using FIG. 10.

First, the moving picture type judgment section 301 judges whether the moving picture is a stereoscopic picture as a judgment of the type of an input moving picture (step S1001). When the input moving picture is a stereoscopic picture, the moving picture type judgment section 301 sets the stereoscopic picture identifier to "1" (step S1002) and the moving picture rotation section 303 rotates the input moving picture clockwise by +90 degrees or −90 degrees in accordance with a predetermined rotation method (step 1004). On the other hand, when the input moving picture is not a stereoscopic picture, the moving picture type judgment section 301 sets stereoscopic picture identifier to "0" (step S1003).

As described above, the switch 304 selects the moving picture signal 311 sent from the moving picture rotation section 303 when the stereoscopic picture identifier 310 is "1" or the moving picture signal 309 sent from the switch 302 when the stereoscopic picture identifier 310 is "0", and sends the selected moving picture signal to the moving picture interlaced encoding section 305 as the moving picture signal 312.

The moving picture interlaced encoding section 305 that has received the moving picture signal 312 performs the interlaced encoding of the moving picture (step S1005) and produces the encoded bit stream 313. The stereoscopic picture identifier encoding section 306 performs the encoding of the stereoscopic picture identifier (step S1006) and produces the encoded information 314.

Figure 10:
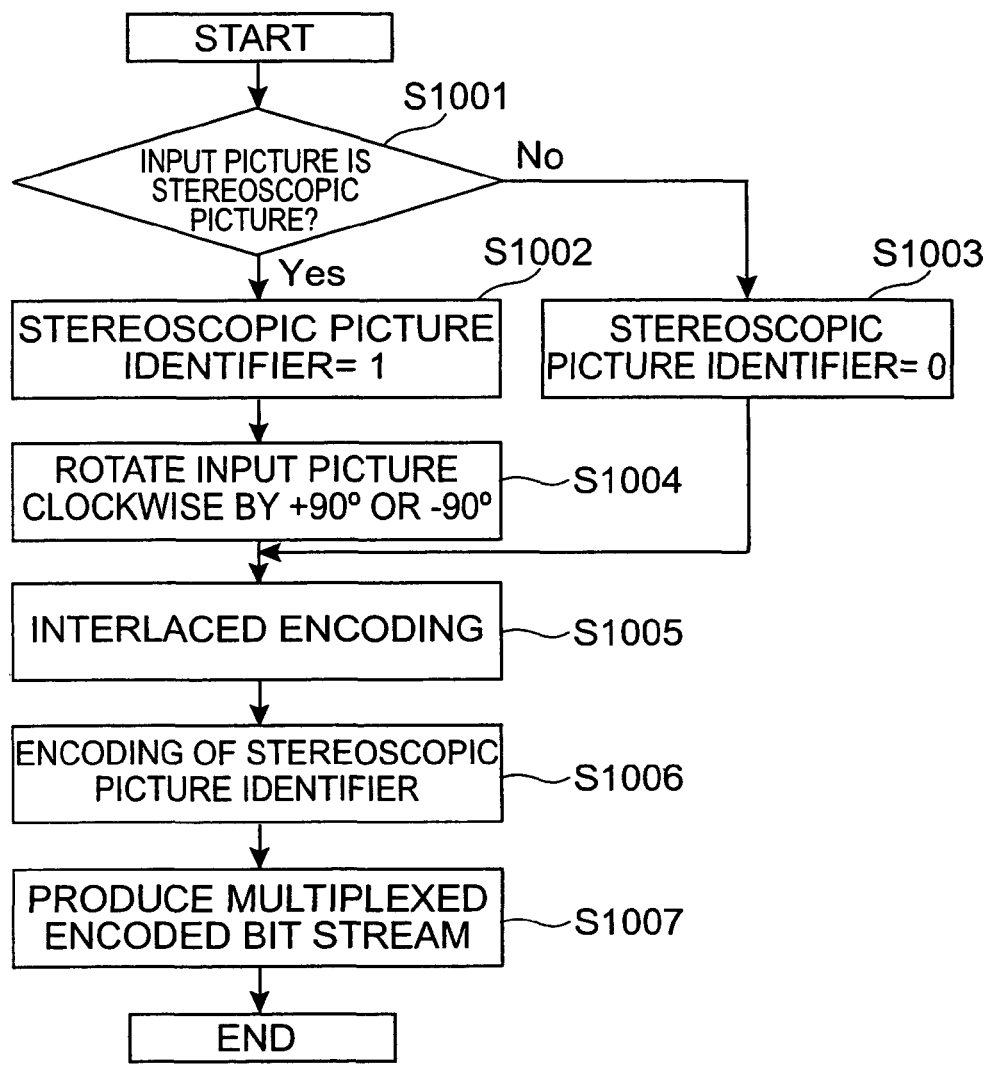
FIG. 10 is a flow chart showing the operation of the moving picture encoding apparatus in the first embodiment.

Finally, the multiplexing section 307 multiplexes the encoded bit stream 313 and the encoded information 314 to produce the multiplexed encoded bit stream 315 (step S1007) and the processing shown in FIG. 10 is completed.

(Configuration of Moving Picture Decoding Apparatus)

Figure 11:
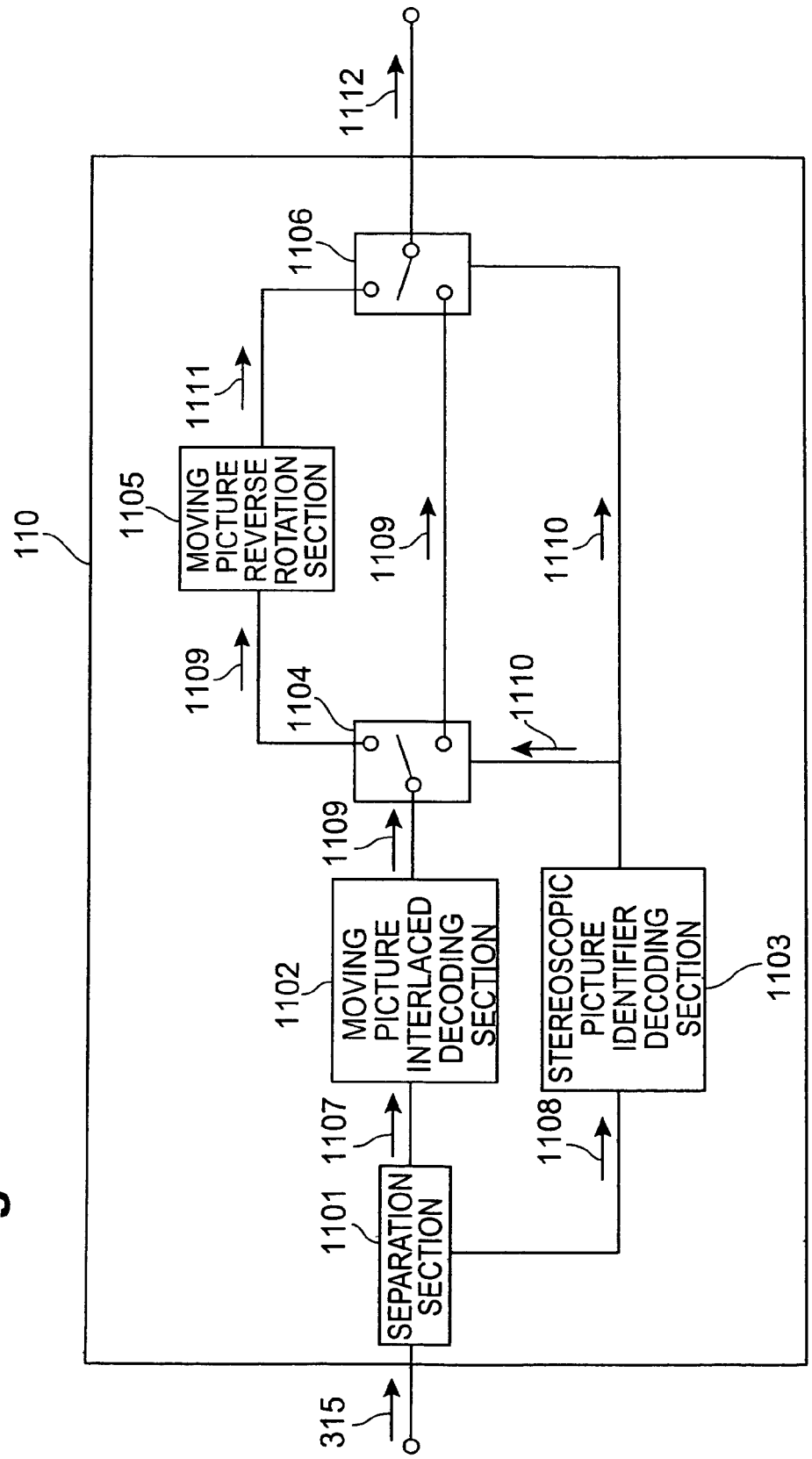
FIG. 11 is a diagram showing a moving picture decoding apparatus in the first embodiment.

Next, the moving picture decoding apparatus according to the present invention is explained below using FIG. 11. A moving picture decoding apparatus 110 according to the present invention comprises, as its functional components, a separation section 1101, a moving picture interlaced decoding section 1102, a stereoscopic picture identifier decoding section 1103, a switch 1104, a moving picture reverse rotation section 1105, and a switch 1106.

The separation section 1101 separates the input multiplexed encoded bit stream 315 into an encoded bit stream 1107 of a moving picture and a stereoscopic picture identifier code 1108 and sends the encoded bit stream 1107 to the moving picture interlaced decoding section 1102 and the stereoscopic picture identifier code 1108 to the stereoscopic picture identifier decoding section 1103, respectively.

The moving picture interlaced decoding section 1102 obtains a moving picture signal 1109 by performing the decoding of the encoded bit stream of the moving picture sent from the separation section 1101. Then, the moving picture interlaced decoding section 1102 sends the moving picture signal 1109 obtained by the decoding to the switch 1104. One of examples of the interlaced decoding system used by the moving picture interlaced decoding section 1102 is the H.264/AVC decoding system. However, any system of decoding method associated with the decoding of an interlaced picture can be applied, not limited to the H.264/AVC decoding system.

The stereoscopic picture identifier decoding section 1103 performs the decoding of the stereoscopic picture identifier code 1108 sent from the separation section 1101 and sends a decoded stereoscopic picture identifier 1110 to the switch 1104 and the switch 1106.

The switch 1104 receives the moving picture signal 1109 sent from the moving picture interlaced decoding section 1102 and the stereoscopic picture identifier 1110 sent from the stereoscopic picture identifier decoding section 1103 and sends the moving picture signal 1109 to the moving picture reverse rotation section 1105 when the stereoscopic picture identifier is "1" and the moving picture signal 1109 to the switch 1106 when the stereoscopic picture identifier is "0".

Figure 12:
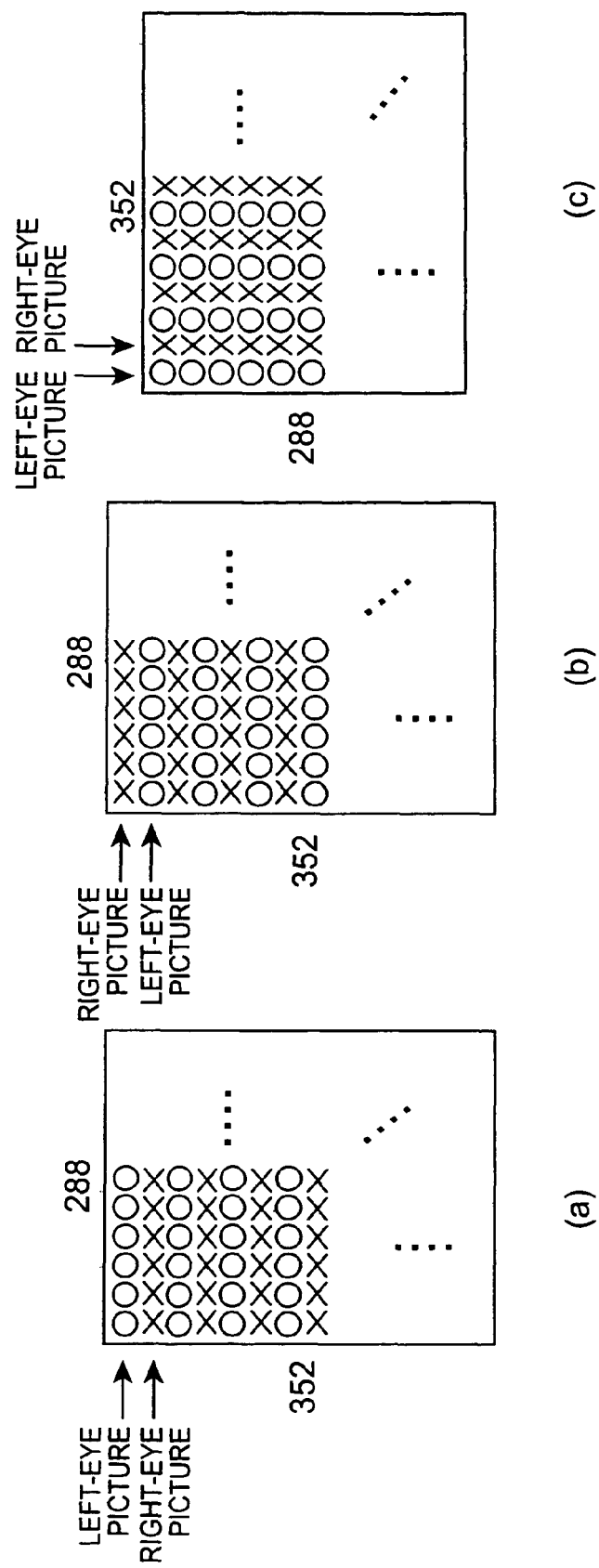
FIG. 12 is a diagram showing a first pixel arrangement of a moving picture signal sent from a switch 1104, a second pixel arrangement of a moving picture signal sent from the switch 1104, and the pixel arrangement of the first pixel arrangement rotated counterclockwise by +90 degrees or of the second pixel arrangement rotated counterclockwise by −90 degrees.

The moving picture reverse rotation section 1105 receives the moving picture signal 1109 sent from the switch 1104, converts the moving picture shown in FIG. 12 (a) represented by the moving picture signal 1109 into the moving picture signal 1111, in which moving picture right-eye pictures and left-eye pictures are arranged alternately in every other column as shown in FIG. 12 (c), by rotating the moving picture counterclockwise by +90 degrees, and sends the moving picture signal 1111 to the switch 1106. The moving picture reverse rotation section 1105 corresponds to a "processing control section" stated in claims. By the way, FIG. 12 described above shows an example of an input picture having 352 pixels in the horizontal direction and 288 pixels in the vertical direction.

The switch 1106 selects either a moving picture signal 1111 sent from the moving picture reverse rotation section 1105 or the moving picture signal 1109 sent from the switch 1104 based on the stereoscopic picture identifier 1110 sent from the stereoscopic picture identifier decoding section 1103. In other words, the switch 1106 selects the moving picture signal 1111 sent from the moving picture reverse rotation section 1105 when the stereoscopic picture identifier 1110 is "1" or the moving picture signal 1109 sent from the switch 1104 when the stereoscopic picture identifier 1110 is "0", and outputs the selected moving picture signal to a display device (not shown) with a predetermined timing as a moving picture signal 1112 to reproduce the input video picture signal.

The moving picture reverse rotation section 1105 may receive the moving picture signal 1109 sent from the switch 1104, convert the moving picture shown in FIG. 12 (b) represented by the moving picture signal 1109 into the moving picture signal 1111, in which moving picture left-eye pictures and right-eye pictures are arranged alternately in every other column as shown in FIG. 12 (c), by rotating the moving picture counterclockwise by −90 degrees, and send the moving picture signal 1111 to the switch 1106.

The moving picture reverse rotation section 1105 rotates, in accordance with a predetermined rotation method the moving picture represented by the moving picture signal 1109 counterclockwise by +90 degrees or −90 degrees after receiving the moving picture signal 1109 sent from the switch 1104.

The processing in which the moving picture reverse rotation section 1105 rotates the moving picture signal 1109 counterclockwise either by +90 degrees or −90 degrees may be performed based on the code included in the multiplexed encoded bit stream 315 together with the stereoscopic picture identifier as information about the encoding of the moving picture. For example, the following processing may be performed. When the code is "10", which code relates to the encoding of the moving picture of the multiplexed encoded bit stream 315, the stereoscopic picture identifier is set to "1" and the moving picture reverse rotation section 1105 rotates the moving picture signal 1109 sent from the switch 1104 counterclockwise by +90 degrees. When the above-mentioned code is "11", the stereoscopic picture identifier is set to "1" and the moving picture reverse rotation section 1105 rotates the moving picture signal 1109 sent from the switch 1104 counterclockwise by −90 degrees. When the above-mentioned code is "0", the stereoscopic picture identifier is set to "0".

(Operation of Moving Picture Decoding Apparatus)

Figure 13:
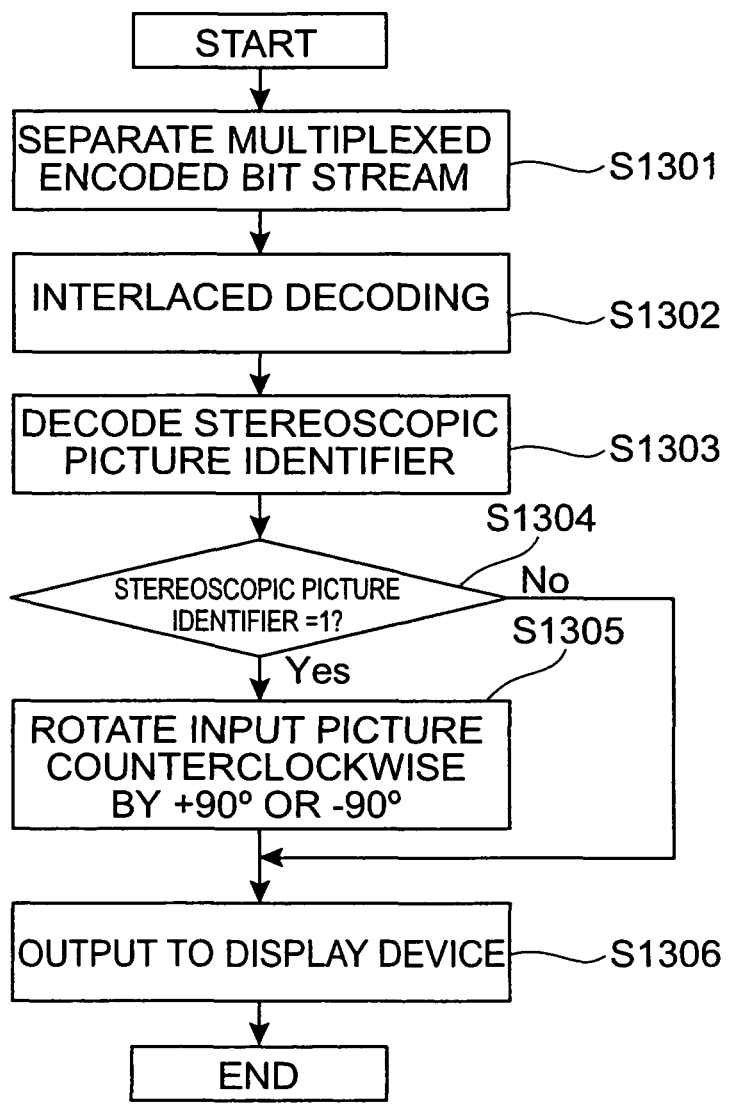
FIG. 13 is a flow chart showing the operation of the moving picture decoding apparatus in the first embodiment.

Next the operation of the moving picture decoding apparatus 110 of the present invention is explained below using FIG. 13.

First, the separation section 1101 receives the input multiplexed encoded bit stream and separates it into the encoded bit stream 1107 of the moving picture and the stereoscopic picture identifier code 1108 (step S1301).

Next, the moving picture interlaced decoding section 1102 reproduces the moving picture signal 1109 by decoding the encoded bit stream 1107 of the moving picture (step S1302). Then, the stereoscopic picture identifier decoding section 1103 reproduces the stereoscopic picture identifier 1110 by decoding the stereoscopic picture identifier code 1108 (step S1303).

Next, judgment is made as to whether the stereoscopic picture identifier is "1" (step S1304) and, when the stereoscopic picture identifier being "1", the moving picture reverse rotation section 1105 rotates the above-mentioned reproduced moving picture signal 1109 counterclockwise by +90 degrees or −90 degrees (step S1305). On the other hand, when the stereoscopic picture identifier is not "1", the rotation process in step S1305 is skipped and the flow chart proceeds to step S1306, which will be described later.

Finally, the switch 1106 selects either the moving picture signal 1111 sent from the moving picture reverse rotation section 1105 when the stereoscopic picture identifier is "1" or the moving picture signal 1109 sent from the switch 1104 when the stereoscopic picture identifier 1110 is "0" and outputs the selected moving picture signal to a display device (not shown) with a predetermined timing as the moving picture signal 1112 (step S1306).

According to the first embodiment described above, the data compression efficiency can be improved by performing the interlaced encoding of a stereoscopic moving picture signal, in which moving picture left-eye pictures and right-eye pictures are arranged alternately in every other column, after rotating it by +90 degrees or −90 degrees to make its pixel arrangement identical to that of an interlaced picture and utilizing the correlativity between the left-eye picture and the right-eye picture.

By rotating, with the motion picture rotation section 303, a stereoscopic picture by +90 degrees or −90 degrees to make its pixel arrangement identical to that of an interlaced picture, performing the interlaced encoding thereof, and reversely rotating, with the moving picture reverse rotation section 1105, the decoded picture by +90 degrees or −90 degrees to reproduce it into a stereoscopic picture, the same picture signal as that of the input picture can be obtained without the need to change the order in the line of the pixel signals after the decoding process when the picture is displayed in a parallax barrier system stereoscopic motion picture display device.

Since it is possible to perform the encoding of a stereoscopic motion picture signal, in which moving left-eye pictures and right-eye pictures are arranged alternately in every other column and an interlaced motion picture signal, in which motion picture pictures of odd number row and pictures of even number row are arranged alternately in every other row using the same moving picture encoding apparatus and at the same time to perform the decoding thereof using the same motion picture decoding apparatus, the effective use of the apparatus is possible.

By the way, the moving picture rotation section 303 and the moving picture reverse rotation section 1105 may rotate the moving picture signal 309 and the moving picture signal 1109 clockwise by +90 degrees or −90 degrees or counterclockwise by +90 degrees or −90 degrees, respectively, in units of a frame.

Further, the moving picture rotation section 303 and the moving picture reverse rotation section 1105 may rotate the moving picture signal 309 and the moving picture signal 1109 clockwise by +90 degrees or −90 degrees or counterclockwise by +90 degrees or −90 degrees, respectively, in slice units.

Still further, the moving picture rotation section 303 and the moving picture reverse rotation section 1105 may rotate the moving picture signal 309 and the moving picture signal 1109 clockwise by +90 degrees or −90 degrees or counterclockwise by +90 degrees or −90 degrees, respectively, in macro block units.

In the above, examples are shown in which the rotation is made in the clockwise direction by +90 degrees or −90 degrees or in the counterclockwise direction by −90 degrees or −90 degrees, but the rotation angles are not limited to these, as long as rotation is made so that the vertical direction of a moving picture changes to the horizontal direction. For example, rotation patterns such as +270 degrees or −270 degrees in the clockwise direction or +270 degrees or −270 degrees in the counterclockwise direction may be employed.

In the above, examples are shown in which the moving picture signal is rotated in the predetermined direction by the moving picture rotation section 303 and rotated in the reverse direction of the predetermined direction (that is, reversely rotated) by the moving picture reverse rotation section 1105, but the direction of rotation is not limited to these, and the original moving picture signal may be reproduced by rotating, with the moving picture reverse rotation section 1105, the moving picture signal in the same direction as the predetermined direction. For example, the original moving picture signal may be reproduced by rotating, with the moving picture rotation section 303, the moving picture signal clockwise by +90 degrees and rotating, with the moving picture reverse rotation section 1105, it clockwise by +270 degrees.

Second Embodiment (Configuration of Moving Picture Encoding Apparatus)

A moving picture encoding apparatus 140 according to the present invention is explained below using FIG. 14. The moving picture encoding apparatus 140 described below is in compliance with the H.264/AVC encoding system.

An input video signal to be input as a moving picture signal to the moving picture encoding apparatus 140 is a moving picture signal that represents a stereoscopic moving picture in which right-eye pictures and left-eye pictures are arranged alternately in every other column or an interlaced moving picture in which pictures of odd number row and pictures of even number row are arranged alternately in every other row. In the present embodiment, a picture represented by an input moving picture signal is divided into macro blocks, which are fixed square regions with 16 pixels by 16 lines and the following encoding processing is performed in macro block units.

Figure 14:
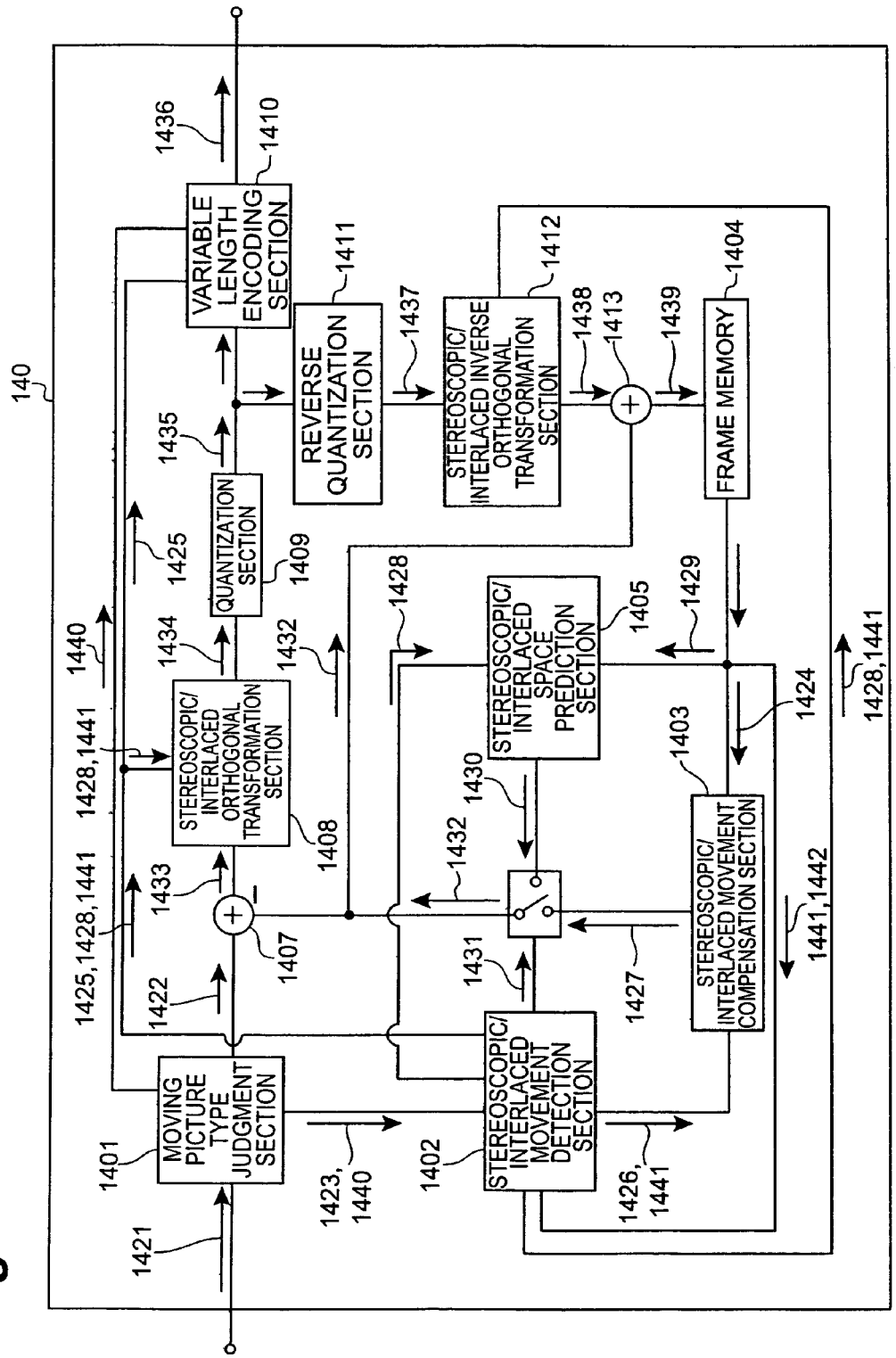
FIG. 14 is a diagram showing a moving picture encoding apparatus in a second embodiment.

As shown in FIG. 14, the moving picture encoding apparatus 140 comprises, as its functional components, a moving picture type judgment section 1401, an stereoscopic/interlaced motion detection section 1402, an stereoscopic/interlaced motion compensation section 1403, a frame memory 1404, an stereoscopic/interlaced spatial prediction section 1405, a switch 1406, a subtracter 1407, an stereoscopic/interlaced orthogonal transformation section 1408, a quantization section 1409, a variable length encoding section 1410, a reverse quantization section 1411, an stereoscopic/interlaced inverse orthogonal transformation section 1412, and an adder 1413. Each component is explained below.

After receiving an input video signal 1421 as a moving picture signal representing a moving picture to be encoded and input from the outside, the moving picture type judgment section 1401 divides the picture (referred to as an "input picture", hereinafter) represented by the input video signal 1421 into macro blocks and sends input picture signals 1422 and 1423 in macro block units to the subtracter 1407 and the stereoscopic/interlaced motion detection section 1402, respectively. On the other hand, the moving picture type judgment section 1401 judges whether the input picture is a stereoscopic picture and sets the stereoscopic picture identifier, which is information about the type of a picture, to "1" when the input picture is a stereoscopic picture or sets the stereoscopic picture identifier to "0" when the input picture is not a stereoscopic picture. Then, the moving picture type judgment section 1401 sends the information of the stereoscopic picture identifier to the stereoscopic/interlaced motion detection section 1402 and the variable length encoding section 1410 as a signal 1440, together with information about the encoding of the whole of a moving picture (sequence header), information about the encoding in each frame picture unit (frame header), information about the encoding in each slice unit consisting of one or more integrated macro blocks (slice header), and information about the encoding in each macro block unit (macro block header). The code of the stereoscopic picture identifier may be transmitted in a state of being included in the sequence header as shown in FIG. 6 or may be transmitted in a state of being included in the frame header as shown in FIG. 7. Further, the code of the stereoscopic picture identifier may be transmitted in a state of being included in the slice header as shown in FIG. 8 or may be transmitted in a state of being included in the macro block header as shown in FIG. 9.

The frame memory 1404 is a section for storing a frame picture signal having been subjected to the encoding in the past.

The stereoscopic/interlaced motion detection section 1402 is a section for selecting a prediction mode and detecting a motion vector based on the signal 1440 consisting of integrated information about the type of the picture sent from the moving picture type judgment section 1401, sequence header, frame header, slice header, and macro block header. The H.264/AVC encoding system is provided, as a prediction mode, with a plurality of interframe prediction modes for making a prediction by referring to a plurality of encoded frame picture signals different in time from the input video signal and a plurality of intraframe prediction modes for making a spatial prediction using the values of the neighboring encoded pixels in the same space. Specifically, when selecting the interframe prediction mode as a prediction mode, the motion detection section 1402 searches for a picture signal pattern similar to the picture signal pattern in the region to be encoded in a predetermined search range from among the plurality of encoded pictures stored in advance in the frame memory 1404 using a reference picture signal 1424 and a motion vector 1442 of a neighboring block. Then, the stereoscopic/interlaced motion detection section 1402 detects a motion vector, which is an amount of spatial displacement between the picture signal pattern in the region to be encoded and the similar picture signal pattern.

In greater detail, when the input picture is a stereoscopic picture (that is, when the stereoscopic picture identifier is set to "11"), the stereoscopic/interlaced motion detection section 1402 compares the encoding efficiency between the case where the interframe prediction for the input picture as a frame picture is made (refer to FIG. 15 (a)) (that is, the case where the interframe prediction is made about the frame picture) and the case where the interframe prediction is made about the input picture separated into the left-field picture (refer to FIG. 15 (b)) and the right-field picture (refer to FIG. 15 (c)) (that is, the case where the interframe prediction is made about the field pictures) and selects the interframe prediction with higher encoding efficiency.

Figure 16:
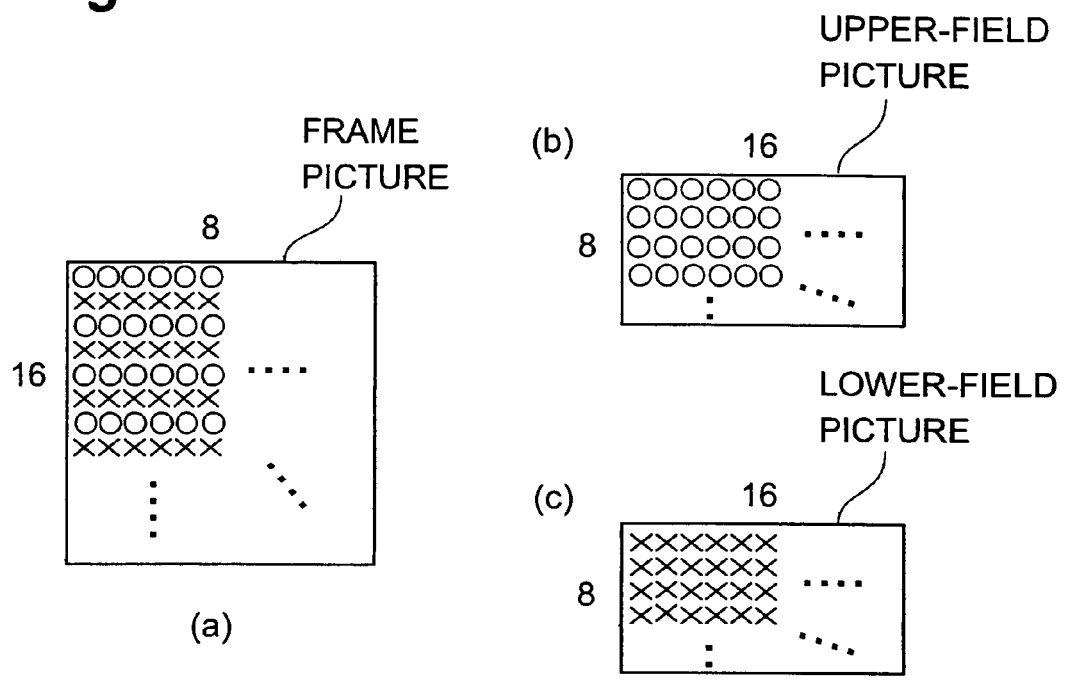
FIG. 16 is a diagram showing a frame picture of an interlaced picture, an upper-field picture of the interlaced picture, and a lower-field picture of the interlaced field.

On the other hand, when the input picture is an interlaced picture (that is, when the stereoscopic picture identifier is set to "0"), the stereoscopic/interlaced motion detection section 1402 compares the encoding efficiency between the case where the interframe prediction for the input picture as a frame picture is made (refer to FIG. 16 (a)) (that is, the case where the interframe prediction is made about the frame picture) and the case where the interframe prediction is made about the input picture separated into the odd-row picture (the upper-field picture: refer to FIG. 16 (b)) and the even-row picture (the lower-field picture: refer to FIG. 16 (c)) (that is, the case where the interframe prediction is made about the field pictures) and selects the interframe prediction with higher encoding efficiency.

The stereoscopic/interlaced motion detection section 1402 sends a signal 1425 to the variable length encoding section 1410, which signal includes a motion vector differential value, which is differential information between the detected motion vector and an optimally predicted motion vector (a predicted motion vector value) calculated from the motion vector 1442 of the encoded neighboring block, the reference frame number indicating the reference frame picture signal used to detect the motion vector, and the selected prediction mode. At the same time, the motion detection section 1402 sends a signal 1426 to the stereoscopic/interlaced motion compensation section 1403, which signal includes the selected prediction mode, the motion vector, and the reference frame number.

On the other hand, the stereoscopic/interlaced motion detection section 1402 sends a signal 1441 representing information as to "whether the selected prediction mode is the interframe prediction about the frame picture or the interframe prediction about the field picture" and information as to "whether the input picture is a stereoscopic picture or an interlaced picture", which is part of information about the prediction mode, to the stereoscopic/interlaced motion compensation section 1403, the stereoscopic/interlaced orthogonal transformation section 1408, and the stereoscopic/interlaced inverse orthogonal transformation section 1412.

The stereoscopic/interlaced motion compensation section 1403 produces a predicted picture signal 1427 for each macro block by referring to the encoded picture signal (the reference picture signal 1424) indicated by the reference frame number in the frame memory 1404 using the above-mentioned signal 1426 sent from the stereoscopic/interlaced motion detection section 1402 and sends it to the switch 1406.

In greater detail, the stereoscopic/interlaced motion compensation section 1403 produces the predicted picture signal 1427 for each macro block by referring to the encoded picture signal (the reference picture signal 1424) indicated by the reference frame number in the frame memory 1404 using the above-mentioned signal 1426 sent from the stereoscopic/interlaced motion detection section 1402 based on the above-mentioned signal 1441.

When the input picture is a stereoscopic picture (when the stereoscopic picture identifier is "1") and the selected prediction mode is the "interframe prediction about a frame picture", the stereoscopic/interlaced motion compensation section 1403 produces the predicted picture signal 1427 after performing motion compensation while taking the macro block to be encoded as one frame picture. On the other hand, when the input picture is a stereoscopic picture and the selected prediction mode is the "interframe prediction about a field picture", the stereoscopic/interlaced motion compensation section 1403 produces the predicted picture signal 1427 by arranging the left-field predicted picture signals and the right-field predicted picture signals alternately in every other column after dividing the macro block to be encoded into the left-field picture and the right-field picture and performing motion compensation thereof.

When the input picture is an interlaced picture (when the stereoscopic picture identifier is "0") and the selected prediction mode is the "interframe prediction about a frame picture", the stereoscopic/interlaced motion compensation section 1403 produces the predicted picture signal 1427 after performing motion compensation while taking the macro block to be encoded as one frame picture. On the other hand, when the input picture is an interlaced picture and the selected prediction mode is the "interframe prediction about a field picture", the stereoscopic/interlaced motion compensation section 1403 produces the predicted picture signal 1427 by arranging the upper-field predicted picture signals and the lower-field predicted picture signals horizontally alternately after dividing the macro block to be encoded into the upper-field picture and the lower-field picture and performing motion compensation.

When selecting the "intra-frame prediction mode" as a prediction mode, the stereoscopic/interlaced motion detection section 1402 makes a spatial prediction using the pixel value of the encoded neighboring block on the same picture and sends the signal 1425 including the prediction mode to the variable length encoding section 1410. In this case, the stereoscopic/interlaced motion detection section 1402 does not perform the process of transmitting the signal of the motion vector differential value, which is information about the movement with respect to time, and the reference frame number to the variable length encoding section 1410. On the other hand, the stereoscopic/interlaced motion detection section 1402 sends a signal 1428 representing information as to "whether the selected prediction mode is the intraframe prediction about the frame picture or the intraframe prediction about the field picture" and information as to "whether the input picture is a stereoscopic picture or an interlaced picture", which is part of information about the prediction mode, to the stereoscopic/interlaced orthogonal transformation section 1408, the stereoscopic/interlaced inverse orthogonal transformation section 1412, and the stereoscopic/interlaced spatial prediction section 1405.

In greater detail, when the input picture is a stereoscopic picture (when the stereoscopic picture identifier is "1"), the stereoscopic/interlaced motion detection section 1402 compares the encoding efficiency between the case where the intraframe prediction for the input picture as a frame picture is made (refer to FIG. 15 (*a*)) (that is, the case where the intraframe prediction is made about the frame picture) and the case where the intraframe prediction is made about the input picture separated into the left-field picture (refer to FIG. 15 (*b*)) and the right-field picture (refer to FIG. 15 (*c*) (that is, the case where the intraframe prediction is made about the field pictures) and selects the intraframe prediction with higher encoding efficiency.

On the other hand, when the input picture is an interlaced picture (when the stereoscopic picture identifier is "0"), the stereoscopic/interlaced motion detection section 1402 compares the encoding efficiency between the case where the intraframe prediction for the input picture as a frame picture is made (refer to FIG. 16 (*a*)) (that is, the case where the intraframe prediction is made about the frame picture) and the case where the intraframe prediction is made about the input picture separated into the odd-row picture (the upper-field picture: refer to FIG. 16 (*b*)) and the even-row picture (the lower-field picture: refer to FIG. 16 (*c*)) (that is, the case where the intraframe prediction is made about the field pictures) and selects the intraframe prediction with higher encoding efficiency.

The stereoscopic/interlaced spatial prediction section 1405 produces a predicted picture signal 1430 for each macro block by referring to the picture signal (a reference picture signal 1429) of the encoded neighboring block in the frame memory 1404 based on the signal 1428 sent from the stereoscopic/interlaced motion detection section 1402 and sends it to the switch 1406.

At this time, when the input picture is a stereoscopic picture (when the stereoscopic picture identifier is "1") and the selected prediction mode is the "intraframe prediction about a frame picture", the stereoscopic/interlaced spatial prediction section 1405 produces the predicted picture signal 1430 after making a spatial prediction while taking the macro block to be encoded as one frame picture. On the other hand, when the input picture is a stereoscopic picture and the selected prediction mode is the "intraframe prediction about a field picture", the stereoscopic/interlaced spatial prediction section 1405 produces the predicted picture signal 1430 by arranging the left-field predicted picture signals and the right-field predicted picture signals alternately in every other column after dividing the macro block to be encoded into the left-field picture and the right-field picture and making a spatial prediction.

On the other hand, when the input picture is an interlaced picture (when the stereoscopic picture identifier is "0") and the selected prediction mode is the "intraframe prediction about a frame picture", the stereoscopic/interlaced spatial prediction section 1405 produces the predicted picture signal 1430 after making a spatial prediction while taking the macro block to be encoded as one frame picture. When the input picture is an interlaced picture and the selected prediction mode is the "intraframe prediction about a field picture", the stereoscopic/interlaced spatial prediction section 1405 produces the predicted picture signal 1430 by arranging the upper-field predicted picture signals and the lower-field predicted picture signals horizontally alternately after dividing the macro block to be encoded into the upper-field picture and the lower-field picture and making a spatial prediction.

The switch 1406 selects either the predicted picture signal 1427 or the predicted picture signal 1430 in accordance with a prediction mode 1431 sent from the stereoscopic/interlaced motion detection section 1402 and sends a selected predicted picture signal 1432 to the subtracter 1407.

The subtracter 1407 produces the differential value (a predictive residue signal 1433) between the input picture signal 1422 and the predicted picture signal 1432 and sends it to the stereoscopic/interlaced orthogonal transformation section 1408.

The stereoscopic/interlaced orthogonal transformation section 1408 produces an orthogonal transformation coefficient 1434 by changing the pixel arrangement of the predictive residue signal 1433 sent from the subtracter 1407 and performing an orthogonal transformation based on the signal 1428 or the signal 1441 sent from the stereoscopic/interlaced motion detection section 1402 and sends it to the quantization section 1409.

Figure 17:
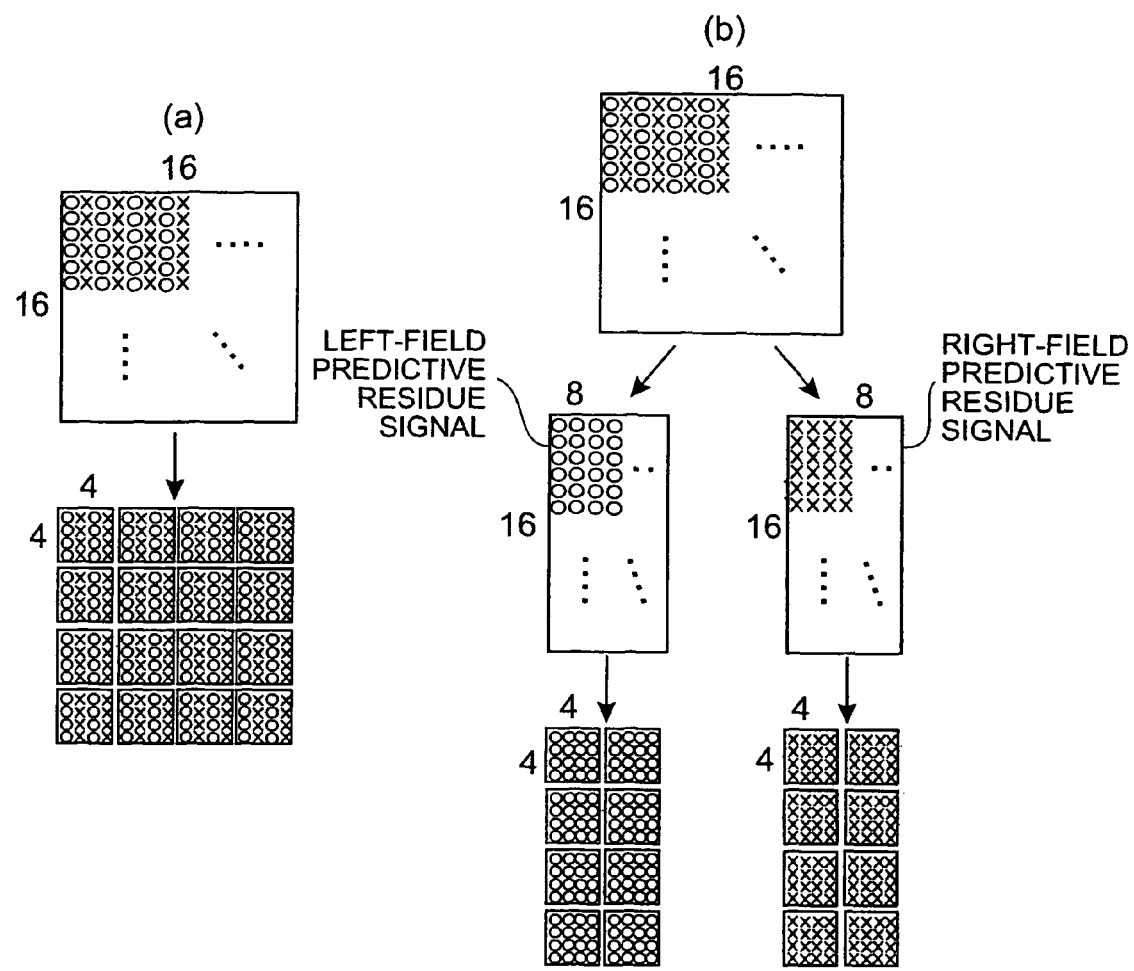
FIG. 17 is a diagram showing an orthogonal transformation block in a frame picture in the pixel arrangement of a predictive residue signal of a stereoscopic picture and orthogonal transformation blocks in field pictures in the pixel arrangements of the predictive residue signal of the stereoscopic picture.

The pixel arrangement of the predictive residue signal 1433 when the input picture is a stereoscopic picture (when the stereoscopic identifier is "1") is shown in FIG. 17. When the prediction mode is the "interframe prediction about a frame picture" or the "intraframe prediction about a frame picture", the stereoscopic/interlaced orthogonal transformation section 1408 divides the pixel arrangement into 4-pixel× 4-line blocks and performs an orthogonal transformation without changing the pixel arrangement of the predictive residue signal 1433, as shown in FIG. 17 (*a*). On the other hand, when the prediction mode is the "interframe prediction about a field picture" or the "intraframe prediction about a field picture", the stereoscopic/interlaced orthogonal transformation section 1408 changes the pixel arrangement into one in which the predictive residue signal 1433 is separated into a left-field predictive residue signal and a right-field predictive residue signal, divides each field into 4-pixel×4-line blocks, and performs an orthogonal transformation, as shown in FIG. 17 (*b*).

Figure 18:
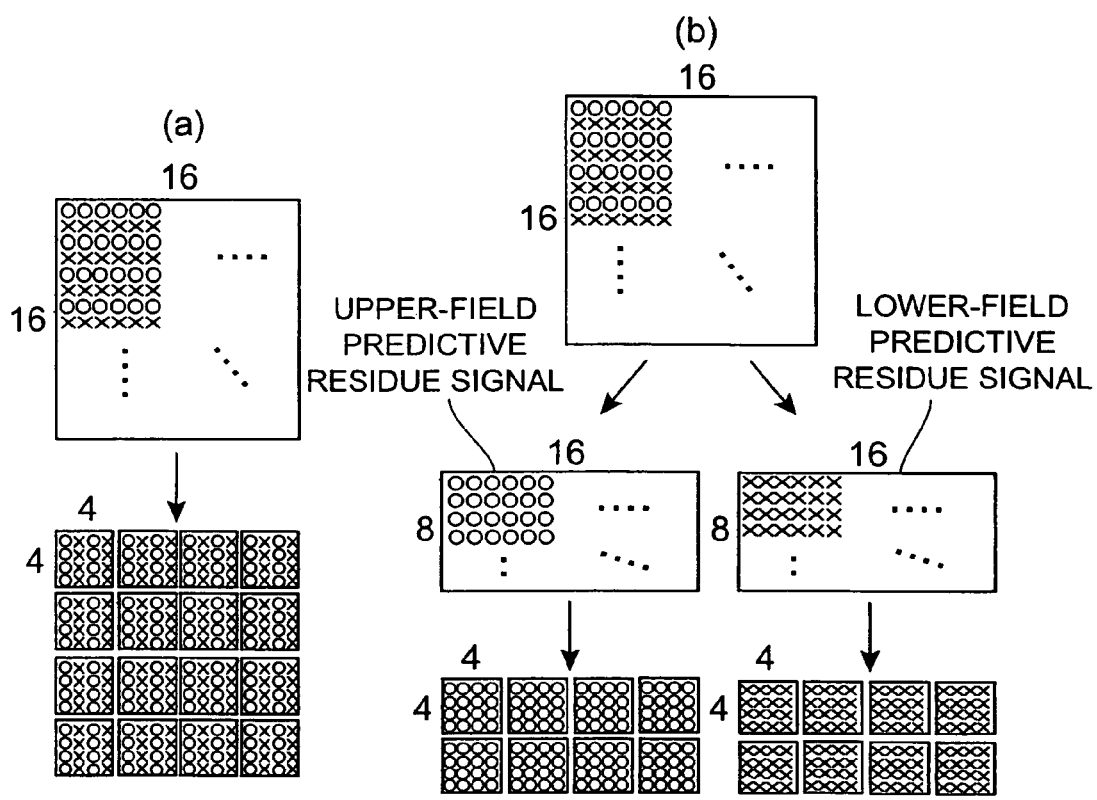
FIG. 18 is a diagram showing an orthogonal transformation block in a frame picture in the pixel arrangement of a predictive residue signal of an interlaced picture and orthogonal transformation blocks in field pictures in the pixel arrangements of the predictive residue signal of the interlaced picture.

The pixel arrangement of the predictive residue signal 1433 when the input picture is an interlaced picture (when the stereoscopic identifier is "0") is shown in FIG. 18. When the prediction mode is the "interframe prediction about a frame picture" or the "intraframe prediction about a frame picture", the stereoscopic/interlaced orthogonal transformation section 1408 divides the pixel arrangement into 4-pixel×4-line blocks and performs an orthogonal transformation without changing the pixel arrangement of the predictive residue signal 1433, as shown in FIG. 18 (a). When the prediction mode is the "interframe prediction about a field picture" or the "intraframe prediction about a field picture", the stereoscopic/interlaced orthogonal transformation section 1408 changes the pixel arrangement into one in which the predictive residue signal 1433 is separated into an upper-field predictive residue signal and a lower-field predictive residue signal, divides each field into 4-pixel×4-line blocks, and performs an orthogonal transformation, as shown in FIG. 18 (b).

The unit of orthogonal transformation is not limited to 4-pixel×4-line, but other units such as 16-pixel×16-line, 8-pixel×8-line, 16-pixel×8-line, and 8-pixel×16-line may be used.

The quantization section 1409 produces a quantization orthogonal transformation coefficient 1435 by quantizing the orthogonal transformation coefficient 1434 sent from the stereoscopic/interlaced orthogonal transformation section 1408 and sends it to the variable length encoding section 1410 and the reverse quantization section 1411.

Next, the variable length encoding section 1410 performs the entropy encoding of the signal 1440 consisting of the integrated information about encoding including the information about the type of the decoded picture (the stereoscopic picture identifier) sent from the moving picture type judgment section 1401, sequence header, frame header, slice header, and macro block header and the signal 1425 including the quantization orthogonal transformation coefficient 1435 sent from the quantization section 1409, the prediction mode sent from the motion detection section 1402, the motion vector differential value, and the reference frame number for multiplexing them into a compressed streams 1436 and transmits it to the outside.

The reverse quantization section 1411 produces an orthogonal transformation coefficient 1437 by performing the reverse quantization of the quantization orthogonal transformation coefficient 1435 sent from the quantization section 1409 and sends it to the stereoscopic/interlaced inverse orthogonal transformation section 1412.

Then, the stereoscopic/interlaced inverse orthogonal transformation section 1412 performs the inverse orthogonal transformation of the orthogonal transformation coefficient 1437 sent from the reverse quantization section 1411 based on the signal 1428 or the signal 1441 sent from the stereoscopic/interlaced motion detection section 1402, changes the pixel arrangement to produce a predictive residue signal 1438, and sends it to the adder 1413.

Figure 19:
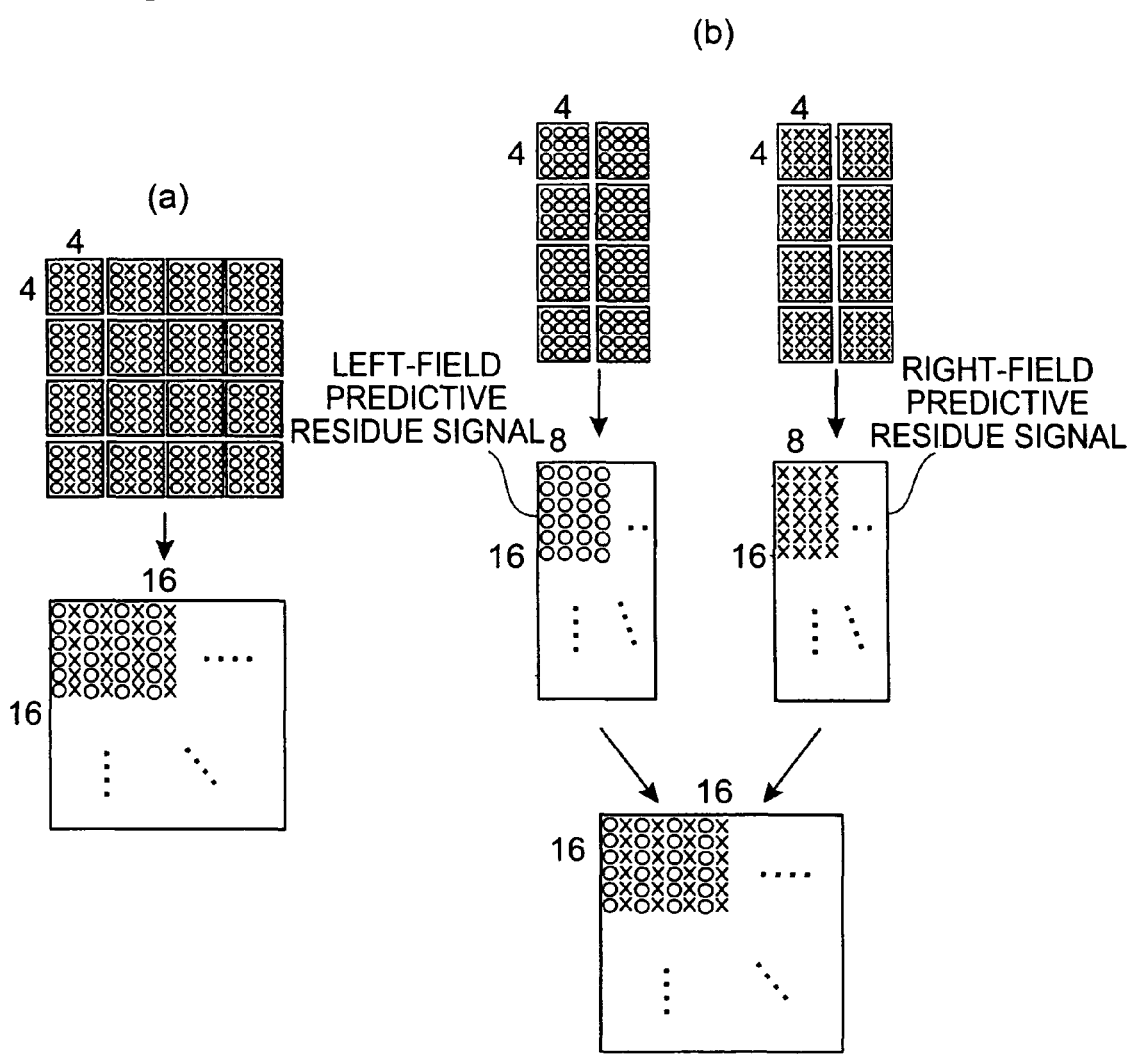
FIG. 19 is a diagram showing the pixel arrangement in a frame picture in the pixel arrangement of a predictive residue signal of a stereoscopic picture immediately after an inverse orthogonal transformation and the pixel arrangement in a field picture in the pixel arrangement of the predictive residue signal of the stereoscopic picture immediately after the inverse orthogonal transformation.

The pixel arrangement change of the predictive residue signal when the input picture is a stereoscopic picture (when the stereoscopic picture identifier is "1") is shown in FIG. 19. When the prediction mode is the "interframe prediction about a frame picture" or the "intraframe prediction about a frame picture", the stereoscopic/interlaced inverse orthogonal transformation section 1412 produces the predictive residue signal 1433 without changing the pixel arrangement to which the inverse orthogonal transformation has been performed for each 4-pixel×4-line block, as shown in FIG. 19 (a). On the other hand, when the prediction mode is the "interframe prediction about a field picture" or the "intraframe prediction about a field picture", the stereoscopic/interlaced inverse orthogonal transformation section 1412 composes and produces the predictive residue signal 1438 by arranging alternately in every other column the left-field predictive residue signal and the right-field predictive residue signal to which the inverse orthogonal transformation has been performed, as shown in FIG. 19 (b).

Figure 20:
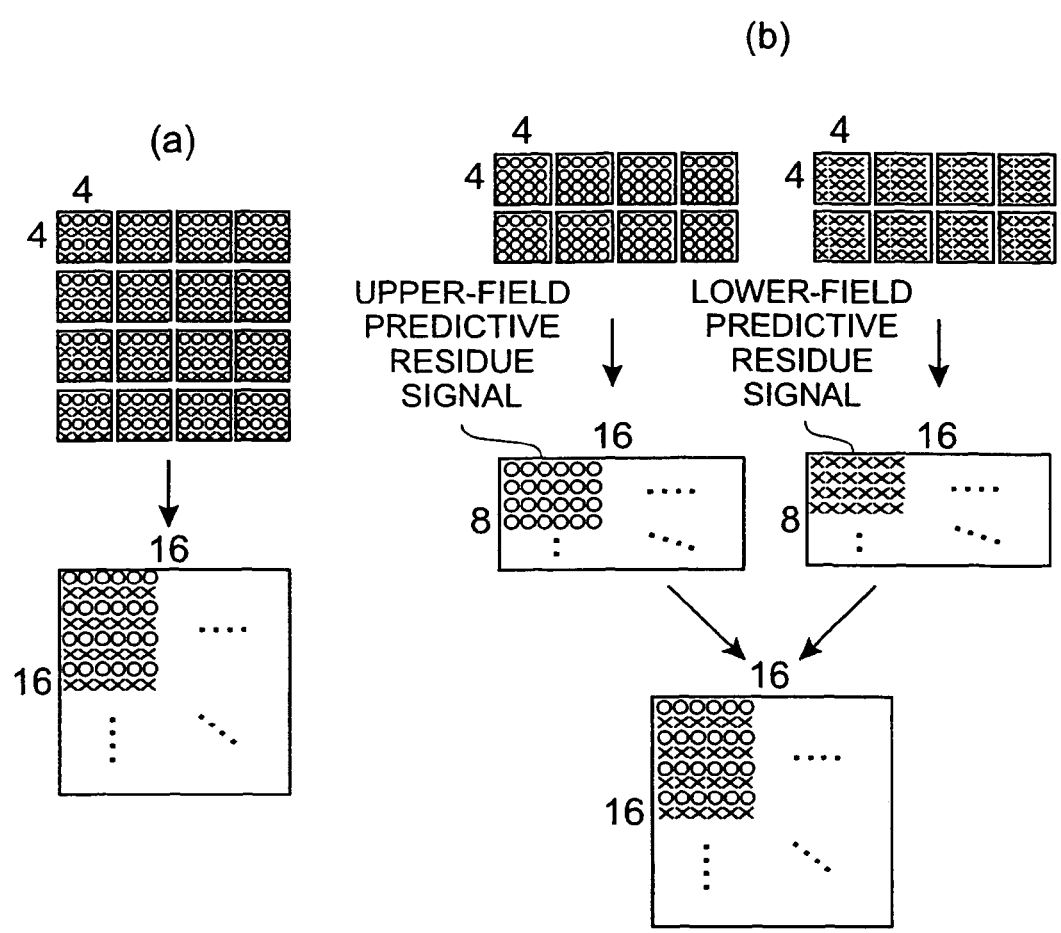
FIG. 20 is a diagram showing the pixel arrangement in a frame picture in the pixel arrangement of a predictive residue signal of an interlaced picture immediately after an inverse orthogonal transformation and the pixel arrangement in a field picture in the pixel arrangement of the predictive residue signal of the interlaced picture immediately after the inverse orthogonal transformation.

On the other hand, the pixel arrangement change of the predictive residue signal when the input picture is an interlaced picture (when the stereoscopic picture identifier is "0") is shown in FIG. 20. When the prediction mode is the "interframe prediction about a frame picture" or the "intraframe prediction about a frame picture", the stereoscopic/interlaced inverse orthogonal transformation section 1412 produces the predictive residue signal 1433 without changing the pixel arrangement to which the inverse orthogonal transformation has been performed for each 4-pixel×4-line block, as shown in FIG. 20 (a). When the prediction mode is the "interframe prediction about a field picture" or the "intraframe prediction about a field picture", the stereoscopic/interlaced inverse orthogonal transformation section 1412 composes and produces the predictive residue signal 1438 by arranging horizontally alternately the upper-field predictive residue signal and the lower-field predictive residue signal to which the inverse orthogonal transformation has been performed, as shown in FIG. 20 (b).

The adder 1413 produces a frame picture signal 1439, which is a local decoded picture, by adding up the predictive residue signal 1438 sent from the stereoscopic/interlaced inverse orthogonal transformation section 1412 and the predicted picture signal 1432 sent from the switch 1406 and sends it to the frame memory 1404. The frame picture signal 1439 is stored in the frame memory 1404 and used as a reference picture signal in the encoding processing, which will be performed later. The information about the motion vector and the reference frame number is also included in the reference frame picture and stored at the same time.

Figure 21:
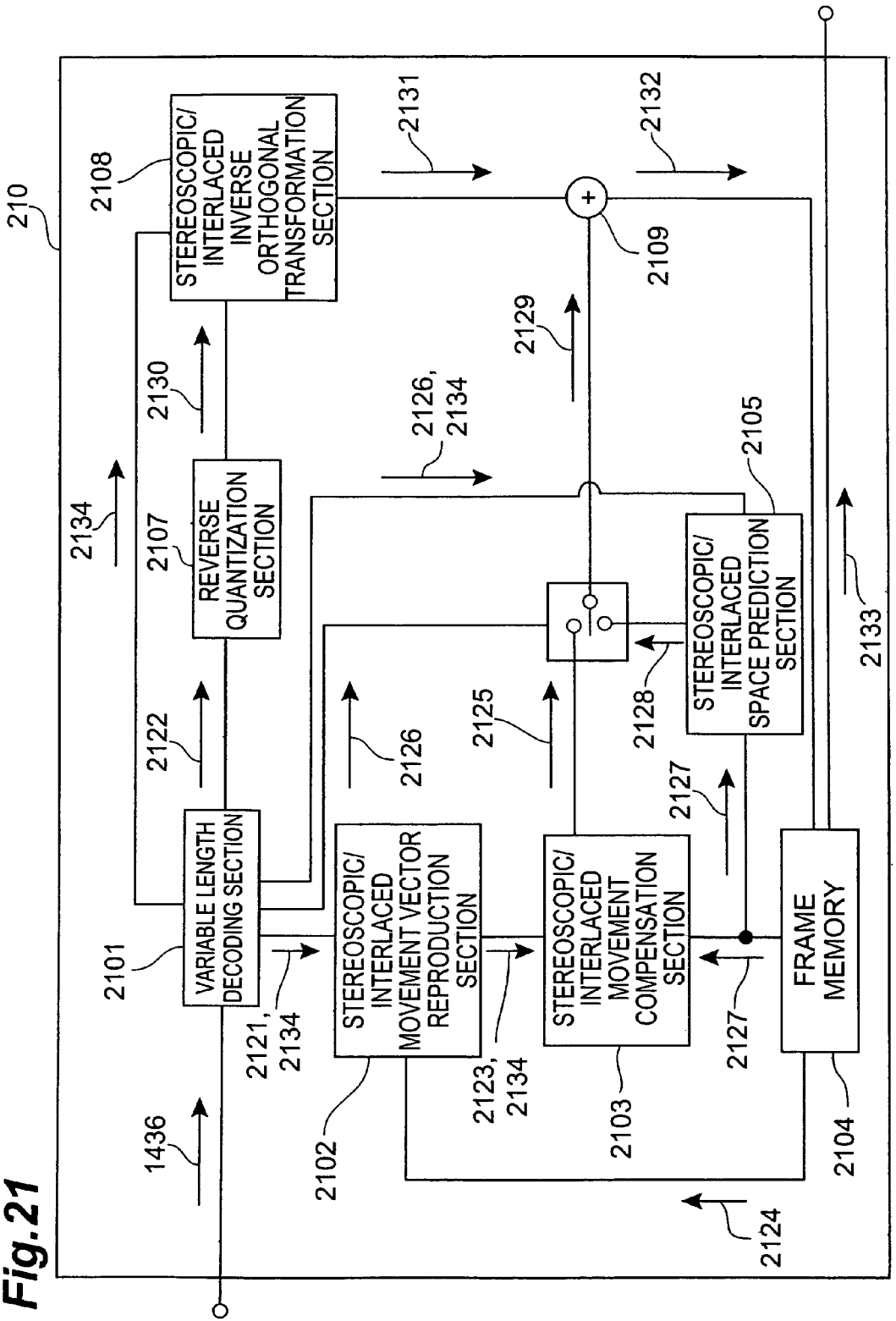
FIG. 21 is a diagram showing a moving picture decoding apparatus in the second embodiment.

Next, the operation of a moving picture decoding apparatus 210 shown in FIG. 21 is explained below. The moving picture decoding apparatus 210 explained below is, as well as the moving picture encoding apparatus 140, a decoding apparatus in compliance with the H.264/AVC encoding system.

The moving picture decoding apparatus 210 uses the compressed stream 1436 output from the moving picture encoding apparatus 140 as an input signal and has a function of decoding the input signal into an input video signal.

As shown in FIG. 21, the moving picture decoding apparatus 210 comprises, as its functional components, a variable length decoding section 2101, an stereoscopic/interlaced motion vector reproduction section 2102, an stereoscopic/interlaced motion compensation section 2103, a frame memory 2104, an stereoscopic/interlaced spatial prediction section 2105, a switch 2106, a reverse quantization section 2107, and stereoscopic/interlaced inverse orthogonal transformation section 2108, and an adder 2109. Each component is explained below.

After receiving the compressed stream 1436, the variable length decoding section 2101 decodes the compressed stream 1436 into a signal 2134 consisting of the integrated synchronization symbol indicating the beginning of a sequence, sequence header, frame header, slice header, macro block header, information about the type of a picture (stereoscopic picture identifier), and "the information as to whether the prediction mode in macro block units is the interframe prediction about a frame picture or the interframe prediction about a field picture or the information as to whether the prediction mode is the intraframe prediction about a frame picture or the intraframe prediction about a field picture" and sends the signal 2134 to the stereoscopic/interlaced motion vector reproduction section 2102, the stereoscopic/interlaced spatial prediction section 2105, and the stereoscopic/interlaced inverse orthogonal transformation section 2108. The variable length decoding section 2101 decodes the prediction mode and the quantization orthogonal transformation coefficient in macro block units as macro block encoding information.

When the prediction mode is the interframe prediction mode, the variable length decoding section 2101 decodes the motion vector differential value and the reference frame number also. The variable length decoding section 2101 sends a decoded quantization orthogonal transformation coefficient 2122 to the reverse quantization section 2107.

When the prediction mode is the interframe prediction mode, the variable length decoding section 2101 sends a decoded prediction mode 2126 to the switch 2106 as well as sending a signal 2121 including the decoded prediction mode, motion vector differential value, and reference frame number to the stereoscopic/interlaced motion vector reproduction section 2102. On the other hand, when the prediction mode is the intraframe prediction mode, the variable length decoding section 2101 sends the decoded prediction mode 2126 to the switch 2106 and the stereoscopic/interlaced spatial prediction section 2105.

When the prediction mode is the interframe prediction mode, the stereoscopic/interlaced motion vector reproduction section 2102 decodes the motion vector using the signal 2134 sent from the variable length decoding section 2101, the motion vector differential value, the motion vector predicted value calculated from a decoded neighboring block motion vector 2124, and sends the above-mentioned signal 2134 and a signal 2123 including the decoded motion vector, prediction mode, and reference frame number to the stereoscopic/interlaced motion compensation section 2103.

In greater detail, when the picture to be decoded (referred to as a "to-be-decoded picture", hereinafter) is a stereoscopic picture (that is, when the stereoscopic picture identifier is "1") and the prediction mode is the "interframe prediction about a frame picture", the stereoscopic/interlaced motion vector reproduction section 2102 decodes the motion vector of the frame picture in macro block units using the motion vector differential value transmitted from the variable length decoding section 2101 and the motion vector predicted value calculated from the decoded neighboring block motion vector 2124. On the other hand, when the to-be-decoded picture is a stereoscopic picture (that is, when the stereoscopic picture identifier is "1") and the prediction mode is the "interframe prediction about a field picture", the stereoscopic/interlaced motion vector reproduction section 2102 decodes the motion vector in each field unit of the left-field picture and the right-field picture using the motion vector differential value transmitted from the variable length decoding section 2101 and the motion vector predicted value calculated from the decoded neighboring block motion vector 2124.

When the to-be-decoded picture is an interlaced picture (that is, when the stereoscopic picture identifier is "0") and the prediction mode is the "interframe prediction about a frame picture", the stereoscopic/interlaced motion vector reproduction section 2102 decodes the motion vector of the frame picture in macro block units using the motion vector differential value transmitted from the variable length decoding section 2101 and the motion vector predicted value calculated from the decoded neighboring block motion vector 2124. On the other hand, when the to-be-decoded picture is an interlaced picture (that is, when the stereoscopic picture identifier is "0") and the prediction mode is the "interframe prediction about a field picture", the stereoscopic/interlaced motion vector reproduction section 2102 decodes the motion vector in each field unit of the upper-field picture and the lower-field picture using the motion vector differential value transmitted from the variable length decoding section 2101 and the motion vector predicted value calculated from the decoded neighboring block motion vector 2124.

The stereoscopic/interlaced motion compensation section 2103 produces a predicted picture signal 2125 using a reference frame picture 2127 transmitted from the frame memory 2104 based on the signal 2134 sent from the stereoscopic/interlaced motion vector reproduction section 2102, the motion vector, the prediction mode, and the reference frame number and sends it to the switch 2106. In the frame memory 2104, the frame picture signals decoded in the past are stored.

In greater detail, when the to-be-decoded picture is a stereoscopic picture (that is, when the stereoscopic picture identifier is "1") and the prediction mode is the "interframe prediction about a frame picture", the stereoscopic/interlaced motion compensation section 2103 produces the predicted picture signal 2125 of the frame picture in macro block units using the reference picture 2127 transmitted from the frame memory 2104 based on the signal 2134 transmitted from the stereoscopic/interlaced motion vector reproduction section 2102, the motion vector, the prediction mode, and the reference frame number. On the other hand, when the to-be-decoded picture is a stereoscopic picture (that is, when the stereoscopic picture identifier is "1") and the prediction mode is the "interframe prediction about a field picture", the stereoscopic/interlaced motion compensation section 2103 produces the predicted picture signal in each field unit of the left-field picture and the right-field picture using the reference picture 2127 transmitted from the frame memory 2104 based on the signal 2134 transmitted from the stereoscopic/interlaced motion vector reproduction section 2102, the motion vector, the prediction mode, and the reference frame number. After that, the stereoscopic/interlaced motion compensation section 2103 produces the predicted picture signal 2125 by arranging alternately in every other column the left-field predicted picture signals and the right-field predicted picture signals.

When the to-be-decoded picture is an interlaced picture (that is, when the stereoscopic picture identifier is "0") and the prediction mode is the "interframe prediction about a frame picture", the stereoscopic/interlaced motion compensation section 2103 produces the predicted picture signal 2125 of the frame picture in macro block units using the reference picture 2127 transmitted from the frame memory 2104 based on the signal 2134 transmitted from the stereoscopic/interlaced motion vector reproduction section 2102, the motion vector, the prediction mode, and the reference frame number. On the other hand, when the to-be-decoded picture is an interlaced picture (that is, when the stereoscopic picture identifier is "0") and the prediction mode is the "interframe prediction about a field picture", the stereoscopic/interlaced motion compensation section 2103 produces the predicted picture signal in each field unit of the upper-field picture and the lower-field picture using the reference picture 2127 transmitted from the frame memory 2104 based on the signal 2134 transmitted from the stereoscopic/interlaced motion vector reproduction section 2102, the motion vector, the prediction mode, and the reference frame number. After that, the stereoscopic/interlaced motion compensation section 2103 produces the predicted picture signal 2125 by arranging horizontally alternately the upper-field predicted picture signals and the lower-field predicted picture signals.

When the prediction mode is the "intraframe prediction mode", the stereoscopic/interlaced spatial prediction section 2105 produces a predicted picture signal 2128 by referring to the encoded neighboring block picture signal (the reference picture signal 2127) and sends it to the switch 2106.

In greater detail, when the to-be-decoded picture is a stereoscopic picture (that is, when the stereoscopic picture identifier is "1") and the prediction mode is the "intraframe prediction about a frame picture", the stereoscopic/interlaced spatial prediction section 2105 produces the predicted picture signal 2128 of the frame picture in macro block units using the reference picture 2127 transmitted from the frame memory 2104 based on the signal 2134 transmitted from the variable length decoding section 2101 and the prediction mode 2126. On the other hand, when the to-be-decoded picture is a stereoscopic picture (that is, when the stereoscopic picture identifier is "1") and the prediction mode is the "intraframe prediction about a field picture", the stereoscopic/interlaced spatial prediction section 2105 produces the predicted picture signal in each field unit of the left-field picture and the right-field picture using the reference picture 2127 transmitted from the frame memory 2104 based on the signal 2134 transmitted from the variable length decoding section 2101 and the prediction mode 2126. After that, the stereoscopic/interlaced spatial prediction section 2105 produces the predicted picture signal 2128 by arranging alternately in every other column the left-field predicted picture signals and the right-field predicted picture signals.

When the to-be-decoded picture is an interlaced picture (that is, when the stereoscopic picture identifier is "0") and the prediction mode is the "intraframe prediction about a frame picture", the stereoscopic/interlaced spatial prediction section 2105 produces the predicted picture signal 2128 of the frame picture in macro block units using the reference picture 2127 transmitted from the frame memory 2104 based on the signal 2134 transmitted from the variable length decoding section 2101 and the prediction mode 2126. On the other hand, when the to-be-decoded picture is an interlaced picture (that is, when the stereoscopic picture identifier is "0") and the prediction mode is the "intraframe prediction about a field picture", the stereoscopic/interlaced spatial prediction section 2105 produces the predicted picture signal in each field unit of the upper-field picture and the lower-field picture using the reference picture 2127 transmitted from the frame memory 2104 based on the signal 2134 transmitted from the variable length decoding section 2101 and the prediction mode 2126. After that, the stereoscopic/interlaced spatial prediction section 2105 produces the predicted picture signal 2128 by arranging horizontally alternately the upper-field predicted picture signal and the lower-field predicted picture signal.

Next, the switch 2106 selects either the predicted picture signal 2125 or the predicted picture signal 2128 in accordance with the prediction mode 2126 transmitted from the variable length decoding section 2101 and sends the selected signal to the adder 2109 as a predicted picture signal 2129.

On the other hand, the reverse quantization section 2107 reproduces the quantization orthogonal transformation coefficient 2122 into an orthogonal transformation coefficient 2130 by reversely quantizing the quantization orthogonal transformation coefficient 2122 transmitted from the variable length decoding section 2101 and sends it to the stereoscopic/interlaced inverse orthogonal transformation section 2108.

The stereoscopic/interlaced inverse orthogonal transformation section 2108 decodes the orthogonal transformation coefficient 2130 into the predictive residue signal 2131 by performing the inverse orthogonal transformation of the orthogonal transformation coefficient 2130.

Since the detailed explanation of the stereoscopic/interlaced inverse orthogonal transformation section 2108 is that same as that of the stereoscopic/interlaced inverse orthogonal transformation section 1412 of the moving picture encoding apparatus 140, the explanation is given below again using FIG. 19 and FIG. 20.

The pixel arrangement change of the predictive residue signal when the input picture is a stereoscopic picture (that is, when the stereoscopic identifier is "1") is shown in FIG. 19. When the prediction mode is the "interframe prediction about a frame picture" or the "intraframe prediction about a frame picture", the stereoscopic/interlaced inverse orthogonal transformation section 2108 produces a predictive residue signal 2131 without changing the pixel arrangement to which the inverse orthogonal transformation has been performed for each 4-pixel×4-line block, as shown in FIG. 19 (a). On the other hand, when the prediction mode is the "interframe prediction about a field picture" or the "intraframe prediction about a field picture", the stereoscopic/interlaced inverse orthogonal transformation section 2108 composes and produces the predictive residue signal 2131 by arranging alternately in every other column the left-field predictive residue signals and the right-field predictive residue signals to which the inverse orthogonal transformation has been performed, as shown in FIG. 19 (b).

The pixel arrangement change of the predictive residue signal when the input picture is an interlaced picture (that is, when the stereoscopic identifier is "0") is shown in FIG. 20. When the prediction mode is the "interframe prediction about a frame picture" or the "intraframe prediction about a frame picture", the stereoscopic/interlaced inverse orthogonal transformation section 2108 produces the predictive residue signal 2131 without changing the pixel arrangement to which the inverse orthogonal transformation has been performed for each 4-pixel×4-line block, as shown in FIG. 20 (a). On the other hand, when the prediction mode is the "interframe prediction about a field picture" or the "intraframe prediction about a field picture", the stereoscopic/interlaced inverse orthogonal transformation section 2108 composes and produces the predictive residue signal 2131 by arranging horizontally alternately the upper-field predictive residue signals and the lower-field predictive residue signals to which the inverse orthogonal transformation has been performed, as shown in FIG. 20 (b).

The adder 2109 decodes as a frame picture signal 2132 by adding up the predicted picture signal 2129 transmitted from the switch 2106 and the predictive residue signal 2131 transmitted from the stereoscopic/interlaced inverse orthogonal transformation section 2108. The adder 2109 corresponds to the "picture data generation section" described in claims and the frame picture signal 2132 corresponds to the "picture data" described in claims.

Since the decoded frame picture signal 2132 is used in the decoding processing performed later, it is stored in the frame memory 2104 as a reference frame picture signal. The frame picture signal 2132 has the same value as that of the frame picture signal 1439 with the same number of the moving picture encoding apparatus 140. Moreover, the information about the motion vector and the reference frame number is also included in the reference frame picture signal and stored at the same time.

Finally, a frame picture signal 2133 is output to a display device (not shown) with a predetermined display timing and the input video signal (moving picture signal) 1421 is reproduced.

According to the second embodiment describe above, the data compression efficiency can be improved by performing encoding and decoding of the stereoscopic moving picture signal, in which moving picture left-eye pictures and right-eye pictures are arranged alternately in every other column, as a frame picture, or as a field picture consisting of the left field and the right field and utilizing the correlation between the left-eye picture and the right-eye picture.

Since an output picture having the same pixel arrangement as that of the input stereoscopic moving picture signal is obtained, when the picture is displayed in a parallax barrier system stereoscopic moving picture display device, the same picture signal as that of the input picture can be obtained without changing the order of the picture signals in the line after decoding processing.

Since it is possible to encode a stereoscopic moving picture signal, in which picture left-eye pictures and right-eye pictures are arranged alternately in every other column and an interlaced moving picture signal, in which picture pictures of odd number row and pictures of even number row are arranged alternately in every other row using the same moving picture encoding apparatus as well as decoding them using the same moving picture decoding apparatus, the effective use of the apparatus is possible.

In the above, examples are shown in which an input picture is divided vertically or horizontally into two field pictures and the interframe prediction or the intraframe prediction is made about the separated field pictures, but the separation methods of an input picture are not limited to these and an input picture may be separated diagonally by an oblique border line, separated horizontally into three or more pictures, or separated vertically into three or more pictures.

Encoding processing programs and decoding processing programs in each embodiment described above are outlined below using FIG. 22 to FIG. 25.

Figure 22:
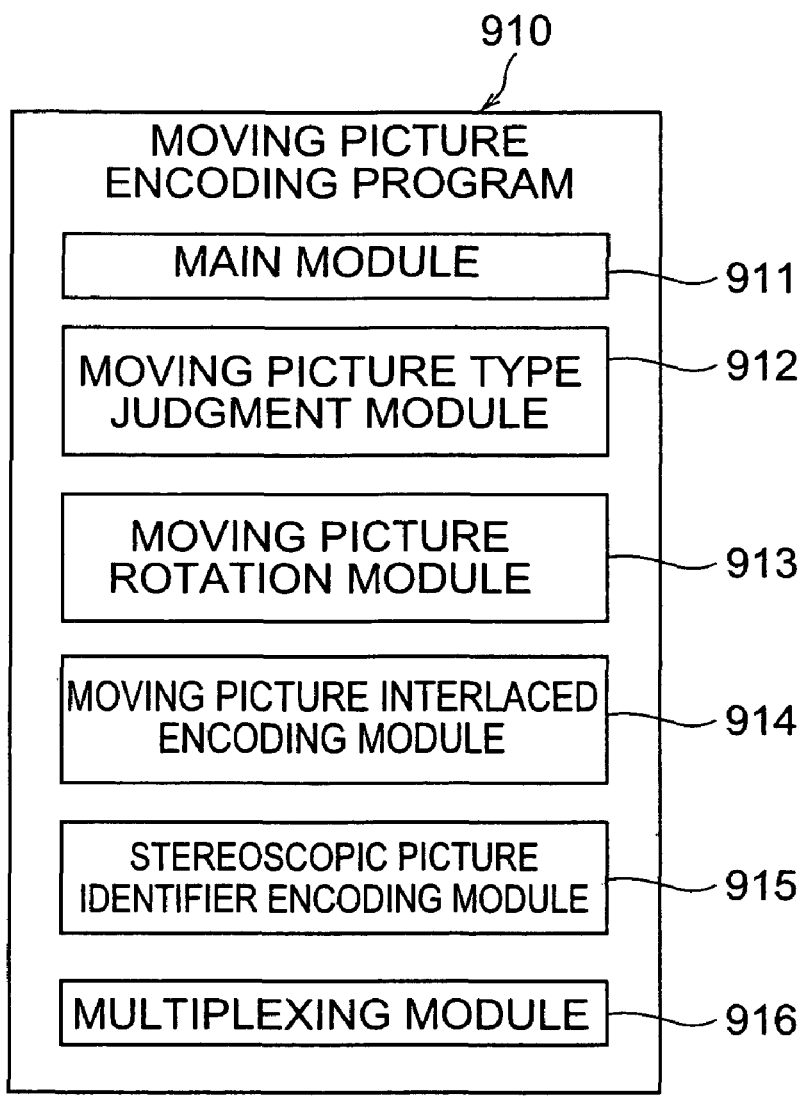
FIG. 22 is a diagram showing the configuration of a moving picture encoding program according to the first embodiment.

FIG. 22 shows the configuration of a moving picture encoding program 910 relating to the moving picture encoding processing in the first embodiment. As shown in FIG. 22, the moving picture encoding program 910 comprises a main module 911 for generalizing processing, a moving picture type judgment module 912, a moving picture rotation module 913, a moving picture interlaced encoding module 914, a stereoscopic picture identifier encoding module 915, and a multiplexing module 916. The functions which the moving picture type judgment module 912, the moving picture rotation module 913, the moving picture interlaced encoding module 914, the stereoscopic picture identifier encoding module 915, and the multiplexing module 916 make a computer execute correspond to the functions of the moving picture type judgment section 301, the moving picture rotation section 303, the moving picture interlaced encoding section 305, the stereoscopic picture identifier encoding section 306, and the multiplexing section 307 described in FIG. 3, respectively.

Figure 23:
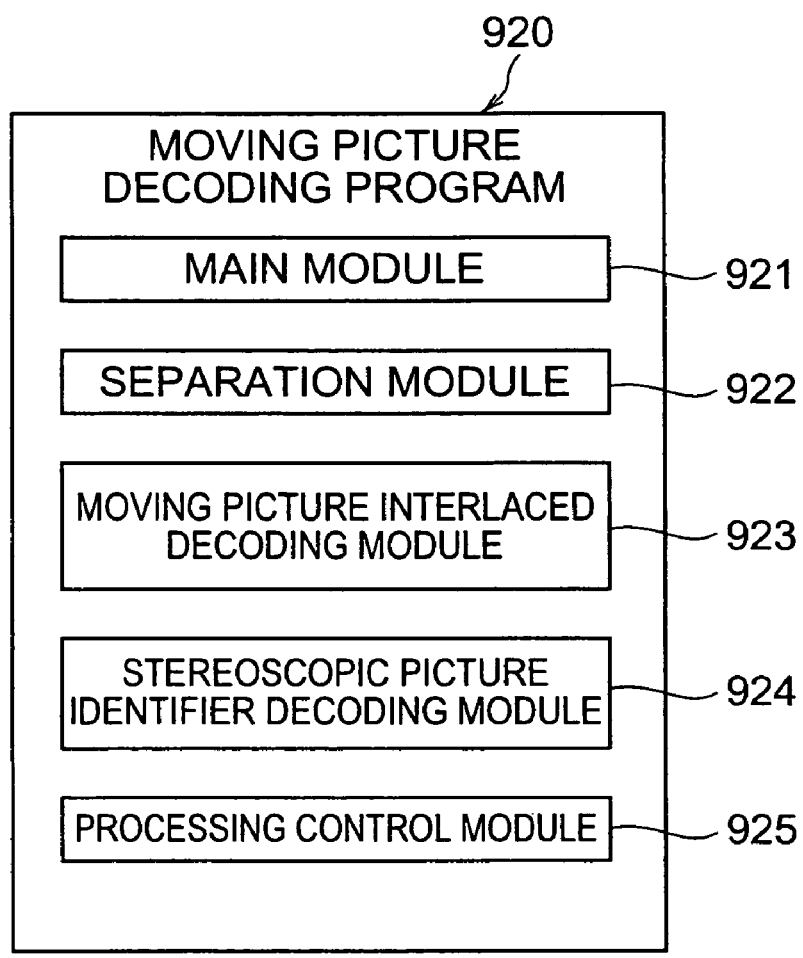
FIG. 23 is a diagram showing the configuration of a moving picture decoding program according to the first embodiment.

FIG. 23 shows the configuration of a moving picture decoding program 920 relating to the moving picture decoding processing in the first embodiment. As shown in FIG. 23, the moving picture decoding program 920 comprises a main module 921 for generalizing processing, a separation module 922, a moving picture interlaced decoding module 923, a stereoscopic picture identifier decoding module 924, and a processing control module 925. The functions which the separation module 922, the moving picture interlaced decoding module 923, and the stereoscopic picture identifier decoding module 924 make a computer execute correspond to the functions of the separation section 1101, the moving picture interlaced decoding section 1102, and the stereoscopic picture identifier decoding section 1103 described in FIG. 11, respectively. The functions which the processing control module 925 makes a computer execute correspond to the functions of the moving picture reverse rotation section 1105 and the switches 1104 and 1106 described in FIG. 11, respectively.

Figure 24:
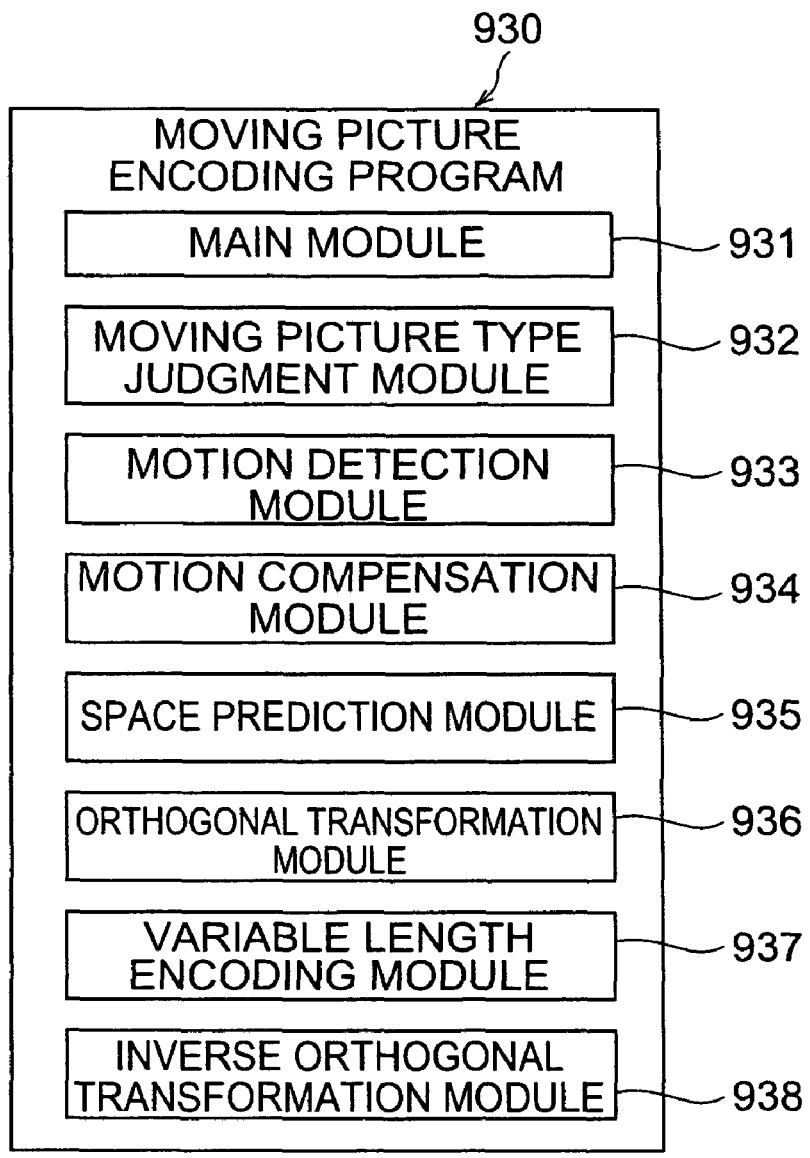
FIG. 24 is a diagram showing the configuration of a moving picture encoding program according to the second embodiment.

FIG. 24 shows the configuration of a moving picture encoding program 930 relating to the moving picture encoding processing in the second embodiment. As shown in FIG. 24, the moving picture encoding program 930 comprises a main module 931 for generalizing processing, a moving picture type judgment module 932, a motion detection module 933, a motion compensation module 934, a spatial prediction module 935, an orthogonal transformation module 936, a variable length encoding module 937, and an inverse orthogonal transformation module 938. The functions which the moving picture type judgment module 932, the motion detection module 933, the motion compensation module 934, and the spatial prediction module 935 make a computer execute correspond to the functions of the moving picture type judgment section 1401, the stereoscopic/interlaced motion detection section 1402, the stereoscopic/interlaced motion compensation section 1403, and the stereoscopic/interlaced spatial prediction section 1405 described in FIG. 14, respectively. The function which the orthogonal transformation module 936 makes a computer execute corresponds to the functions of the switch 1406, the subtracter 1407, and the stereoscopic/interlaced orthogonal transformation section 1408 in FIG. 14. The function which the variable length encoding module 937 makes a computer execute corresponds to the functions of the quantization section 1409 and the variable length encoding section 1410 in FIG. 14. The function which the inverse orthogonal transformation module 938 makes a computer execute corresponds to the functions of the quantization section 1409, the reverse quantization section 1411, and the stereoscopic/interlaced inverse orthogonal transformation section 1412 in FIG. 14.

Figure 25:
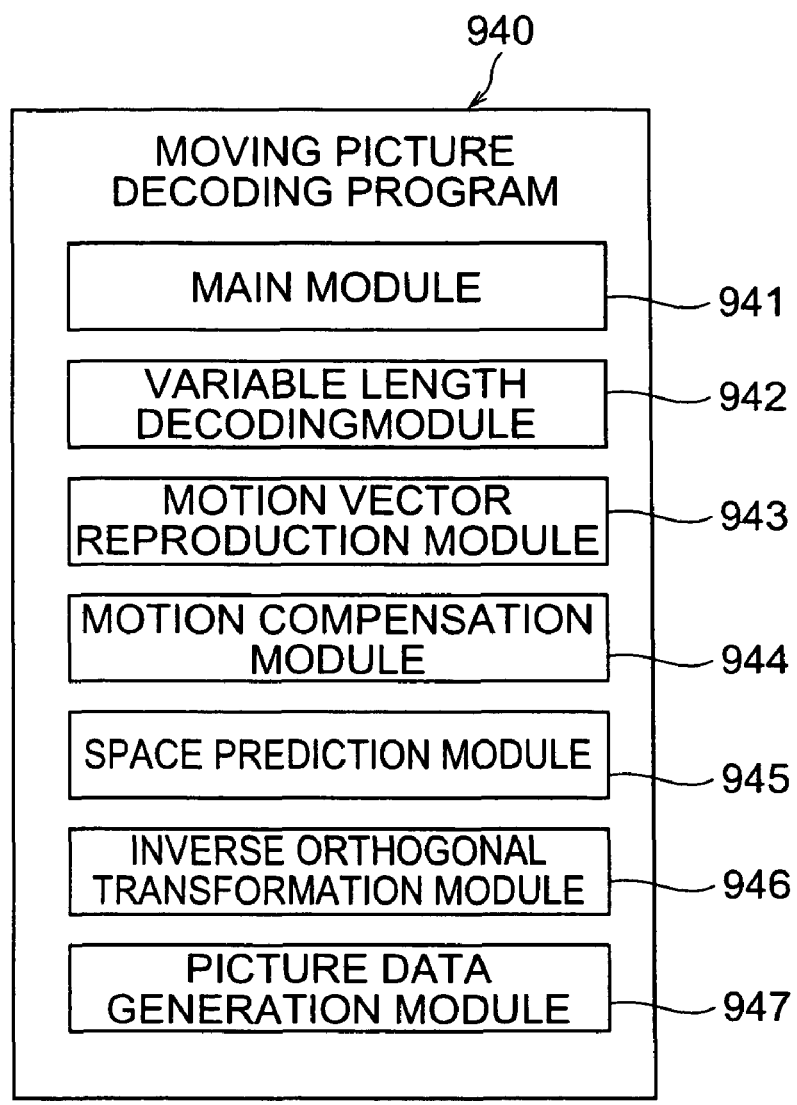
FIG. 25 is a diagram showing the configuration of a moving picture decoding program according to the second embodiment.

FIG. 25 shows the configuration of a moving picture decoding program 940 relating to the moving picture decoding processing in the second embodiment. As shown in FIG. 25, the moving picture decoding program 940 comprises a main module 941 for generalizing processing, a variable length decoding module 942, a motion vector reproduction module 943, a motion compensation module 944, a spatial prediction module 945, an inverse orthogonal transformation module 946, and a picture data generation module 947. The functions which the variable length decoding module 942, the motion vector reproduction module 943, the motion compensation module 944, and the spatial prediction module 945 make a computer execute correspond to the functions of the variable length decoding section 2101, the stereoscopic/interlaced motion vector reproduction section 2102, the stereoscopic/interlaced motion compensation section 2103, and the stereoscopic/interlaced spatial prediction section 2105 described in FIG. 21, respectively. The function which the inverse orthogonal transformation module 946 makes a computer execute corresponds to the functions of the reverse quantization section 2107 and the stereoscopic/interlaced inverse orthogonal transformation section 2108 in FIG. 21. The function which the picture data generation module 947 makes a computer execute corresponds to the function of the adder 2109 in FIG. 21.

Each program described above may be recorded in a computer-readable recoding medium hereinafter, simply referred to as a "recoding medium") and distributed, or part or the whole of the program may be received by the moving picture encoding apparatus or the moving picture decoding apparatus according to the present invention from other devices via a transmission medium such as a communication line and recorded therein. In contrast to this, each program described above may be transmitted from the moving picture encoding apparatus or the moving picture decoding apparatus according to the present invention to other devices via a transmission medium and installed therein.

The disclosure of Japanese Patent Application No. 2004-144074 filed May 13, 2004 including specification, drawings and claims is incorporated herein by reference in its entirety.

What is claimed is:

1. A moving picture encoding apparatus for encoding a stereoscopic moving picture in which right-eye pictures and left-eye pictures are arranged alternately in every other column and an interlaced moving picture in which pictures of odd number row and pictures of even number row are arranged alternately in every other row, the apparatus comprising:
 a moving picture type judgment section configured to judge whether the moving picture to be encoded is a stereoscopic moving picture;
 a moving picture rotation section configured to rotate the moving picture in a predetermined direction by predetermined angles such that the vertical direction in the moving picture changes to the horizontal direction when the moving picture to be encoded is judged to be a stereoscopic moving picture;
 a moving picture interlaced encoding section configured to perform interlaced encoding of a moving picture judged not to be a stereoscopic moving picture and the moving picture judged to be a stereoscopic moving picture and rotated by the predetermined angles;
 a stereoscopic picture identifier encoding section configured to encode a stereoscopic picture identifier indicating whether the moving picture to be encoded is a stereoscopic moving picture; and
 a multiplexing section configured to produce a multiplexed encoded bit stream by multiplexing an encoded bit stream obtained by the interlaced encoding performed by the moving picture interlaced encoding section and the code of a stereoscopic picture identifier obtained by the encoding performed by the stereoscopic picture identifier encoding section.

2. The moving picture encoding apparatus according to claim 1, wherein the stereoscopic picture identifier encoding section is configured to include information about the rotation of the to-be-encoded moving picture performed by the moving picture rotation section, into the stereoscopic picture identifier and carry out encoding of the stereoscopic picture identifier.

3. A moving picture decoding apparatus for decoding a stereoscopic moving picture in which right-eye pictures and left-eye pictures are arranged alternately in every other column and an interlaced moving picture in which pictures of odd number row and pictures of even number row are arranged alternately in every other row, the apparatus comprising:
 a separation section configured to separate a received multiplexed encoded bit stream into an encoded bit stream of a moving picture and a stereoscopic picture identifier code;
 a moving picture interlaced decoding section configured to perform interlaced decoding of the separated encoded bit stream of the moving picture;
 a stereoscopic picture identifier decoding section configured to decode the separated stereoscopic picture identifier code; and
 a processing control section configured to perform picture processing for the moving picture signal obtained by the interlaced decoding performed by the moving picture interlaced decoding section, the picture processing being in accordance with the stereoscopic picture identifier obtained by the decoding performed by the stereoscopic picture identifier decoding section, the picture processing being performed such that the moving picture is reproduced based on the information about a rotation included in the stereoscopic picture identifier obtained by the decoding.

4. A moving picture encoding method of a moving picture encoding apparatus, for encoding a stereoscopic moving picture in which right-eye pictures and left-eye pictures are arranged alternately in every other column and an interlaced moving picture in which pictures of odd number row and pictures of even number row are arranged alternately in every other row, the method comprising:
 judging, with a moving picture type judgment section of the moving picture encoding apparatus, whether the moving picture to be encoded is a stereoscopic moving picture;
 rotating, with a moving picture rotation section of the moving picture encoding apparatus, the moving picture in a predetermined direction by predetermined angles so that the vertical direction changes to the horizontal direction when the moving picture to be encoded is judged to be a stereoscopic moving picture;
 performing, with a moving picture interlaced encoding section of the moving picture encoding apparatus, interlaced encoding of a moving picture judged not to be a stereoscopic moving picture and the moving picture judged to be a stereoscopic moving picture and rotated by the predetermined angles;
 encoding, with a stereoscopic picture identifier encoding section of the moving picture encoding apparatus, a stereoscopic picture identifier indicating whether the moving picture to be encoded is a stereoscopic moving picture; and
 producing, with a multiplexing section of the moving picture encoding apparatus, a multiplexed encoded bit stream by multiplexing an encoded bit stream obtained by the interlaced encoding and the code of a stereoscopic picture identifier obtained by the encoding.

5. A moving picture decoding method of a moving picture decoding apparatus, for decoding a stereoscopic moving picture in which right-eye pictures and left-eye pictures are arranged alternately in every other column and an interlaced moving picture in which pictures of odd number row and pictures of even number row are arranged alternately in every other row, the method comprising:
 separating, with a separation section of the moving picture decoding apparatus, a received multiplexed encoded bit stream into an encoded bit stream of a moving picture and a stereoscopic picture identifier code;
 performing, with a moving picture interlaced decoding section of the moving picture decoding apparatus, interlaced decoding of the separated encoded bit stream of the moving picture;
 decoding, with a stereoscopic picture identifier decoding section of the moving picture decoding apparatus, the separated stereoscopic picture identifier code; and
 performing, with a processing control section of the moving picture decoding apparatus, picture processing for the moving picture signal obtained by the interlaced decoding, the picture processing being in accordance with the stereoscopic picture identifier obtained by the decoding, the picture processing being performed such that the moving picture is reproduced based on the information about a rotation included in the stereoscopic picture identifier obtained by the decoding.

* * * * *